US012498353B2

(12) United States Patent
Remillieux et al.

(10) Patent No.: US 12,498,353 B2
(45) Date of Patent: Dec. 16, 2025

(54) DETECTING SURFACE CRACKS USING ACOUSTIC SIGNALS

(71) Applicants: Chevron U.S.A. Inc., San Ramon, CA (US); Triad National Security, LLC, Los Alamos, NM (US)

(72) Inventors: Marcel Remillieux, Los Alamos, NM (US); James A. Ten Cate, Los Alamos, NM (US); Marcie Alberta Stuber Geesey, Los Alamos, NM (US); Luke Berny Beardslee, Los Alamos, NM (US); Rodney F. Deschamps, San Ramon, CA (US); Robert Kwan Meng Seah, San Ramon, CA (US)

(73) Assignees: Chevron U.S.A. Inc., San Ramon, CA (US); TRIAD NATIONAL SECURITY, LLC, Los Alamos, NM (US)

( * ) Notice: Subject to any disclaimer, the term of this patent is extended or adjusted under 35 U.S.C. 154(b) by 326 days.

(21) Appl. No.: 18/041,789

(22) PCT Filed: Aug. 18, 2020

(86) PCT No.: PCT/US2020/046867
§ 371 (c)(1),
(2) Date: Feb. 15, 2023

(87) PCT Pub. No.: WO2022/039728
PCT Pub. Date: Feb. 24, 2022

(65) Prior Publication Data
US 2024/0011945 A1 Jan. 11, 2024

(51) Int. Cl.
G01N 29/04 (2006.01)
G01N 29/22 (2006.01)
(Continued)

(52) U.S. Cl.
CPC ......... *G01N 29/041* (2013.01); *G01N 29/225* (2013.01); *G01N 29/265* (2013.01);
(Continued)

(58) Field of Classification Search
None
See application file for complete search history.

(56) References Cited

U.S. PATENT DOCUMENTS 7,705,743 B2 * 4/2010 Barone ............... B61L 15/0081
340/682
11,092,573 B2 * 8/2021 Webster ............. G01N 29/4454
(Continued)

FOREIGN PATENT DOCUMENTS

CN 108 872 378 A 11/2018
WO WO 2018/200305 A1 11/2018

OTHER PUBLICATIONS

International Search Report for PCT/US2020/046867 dated Nov. 4, 2020.
(Continued)

Primary Examiner — Suman K Nath
(74) Attorney, Agent, or Firm — King & Spalding LLP

(57) ABSTRACT

A system for detecting cracks in an underwater structure can include an acoustic signal transmitter configured to be disposed proximate to, but without physically contacting, the underwater structure, where the acoustic signal transmitter is configured to emit acoustic signals. The system can also include an acoustic field receiver configured to be disposed proximate to, but without physically contacting, the underwater structure, where the acoustic field receiver is configured to receive resulting acoustic fields. The system can further include a controller that is configured to receive the resulting acoustic fields from the acoustic field receiver. The controller can also be configured to analyze the result-
(Continued)

ing acoustic fields signal. The controller can further be configured to detect, based on analyzing the resulting acoustic fields, a crack in the underwater structure.

20 Claims, 23 Drawing Sheets

(51) Int. Cl.
*G01N 29/265* (2006.01)
*G01N 29/34* (2006.01)
(52) U.S. Cl.
CPC ......... *G01N 29/346* (2013.01); *G01N 29/348* (2013.01); *G01N 2291/105* (2013.01); *G01N 2291/2636* (2013.01); *G01N 2291/2675* (2013.01)

(56) References Cited

U.S. PATENT DOCUMENTS

| 2008/0229834 A1* | 9/2008 | Bossi ................ G01N 29/221 |
| | | 73/627 |
| 2008/0236287 A1 | 10/2008 | Van Agthoven |
| 2010/0199767 A1 | 8/2010 | Ganin |
| 2010/0280773 A1 | 11/2010 | Saether |
| 2011/0058806 A1 | 3/2011 | Sabet et al. |
| 2016/0266251 A1 | 9/2016 | Wilby et al. |
| 2018/0329046 A1 | 11/2018 | Cipolla |
| 2019/0033263 A1 | 1/2019 | Giurgiutiu et al. |

OTHER PUBLICATIONS

Written Opinion of the ISA for PCT/US2020/046867 dated Nov. 4, 2020.
Supplementary European Search Report dated Apr. 15, 2024.

* cited by examiner

DETECTING SURFACE CRACKS USING ACOUSTIC SIGNALS

ACKNOWLEDGEMENT OF GOVERNMENT SUPPORT

The United States government has certain rights in this invention pursuant to Contract No. 89233218CNA000001 between the United States Department of Energy and TRIAD National Security, LLC for the operation of Los Alamos National Laboratory.

PARTIES TO JOINT RESEARCH AGREEMENT

The research work described here was performed under a Cooperative Research and Development Agreement (CRADA) between Los Alamos National Laboratory (LANL) and Chevron under the LANL-Chevron Alliance, CRADA number LA05C10518.

TECHNICAL FIELD

The present application relates generally to detecting surface cracks, and more particularly to systems, methods, and devices for detecting surface cracks using acoustic signals.

BACKGROUND

Load-bearing structures can develop cracks over time, making those structures unstable. These cracks often start very small (e.g., on the order of nanometers) and grow as that part of the structure continues to experience stresses. In some cases, these structures, or significant portions thereof, can be difficult to inspect. For example, such a structure can be located under several hundred or several thousand feet of water. Early detection of these cracks, when they are small, can allow corrective action to be taken to save the integrity of the structure.

SUMMARY

In general, in one aspect, the disclosure relates to a system for detecting cracks in an underwater structure. The system can include a first acoustic signal transmitter configured to be disposed proximate to, but without physically contacting, a first portion of the underwater structure, where the first acoustic signal transmitter is configured to emit a first plurality of acoustic signals at a first frequency toward the first portion of the underwater structure. The system can also include a first acoustic field receiver configured to be disposed proximate to, but without physically contacting, the first portion of the underwater structure, where the first acoustic field receiver is configured to measure a first plurality of resulting acoustic fields, where the first plurality of resulting acoustic fields emanate from the first plurality of acoustic signals traveling through the first portion of the underwater structure. The system can further include a controller communicably coupled to the first acoustic field receiver. The controller can be configured to receive the first plurality of resulting acoustic fields from the first acoustic field receiver. The controller can also be configured to analyze the first plurality of resulting acoustic fields. The controller can further be configured to detect, based on analyzing the first plurality of resulting acoustic fields, a first crack in the first portion of the underwater structure.

In another aspect, the disclosure can generally relate to a method for detecting cracks in an underwater structure. The method can include receiving, from an acoustic field receiver, a first plurality of resulting acoustic fields, where the first plurality of resulting acoustic fields emanate from a first plurality of acoustic signals traveling through a first portion of the underwater structure, wherein the acoustic field receiver is disposed proximate to, but without physically contacting, the first portion of the underwater structure. The method can also include analyzing the first plurality of resulting acoustic fields. The method can further include detecting, based on analyzing the first plurality of resulting acoustic fields, a crack in the first portion of the underwater structure.

In yet another aspect, the disclosure can generally relate to a method for detecting cracks in a structure. The method can include receiving, from an acoustic field receiver, a first plurality of resulting acoustic fields, where the first plurality of resulting acoustic fields emanate from a first plurality of acoustic signals traveling through a first portion of the structure, wherein the acoustic field receiver is disposed proximate to, but without physically contacting, the first portion of the structure. The method can also include analyzing the first plurality of resulting acoustic fields. The method can further include detecting, based on analyzing a third harmonic of the first plurality of resulting acoustic fields, a crack in the first portion of the structure.

These and other aspects, objects, features, and embodiments will be apparent from the following description and the appended claims.

BRIEF DESCRIPTION OF THE DRAWINGS

The drawings illustrate only example embodiments of detecting surface cracks using acoustic signals and are therefore not to be considered limiting of its scope, as detecting surface cracks using acoustic signals may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION OF EXAMPLE EMBODIMENTS

Figure 1:
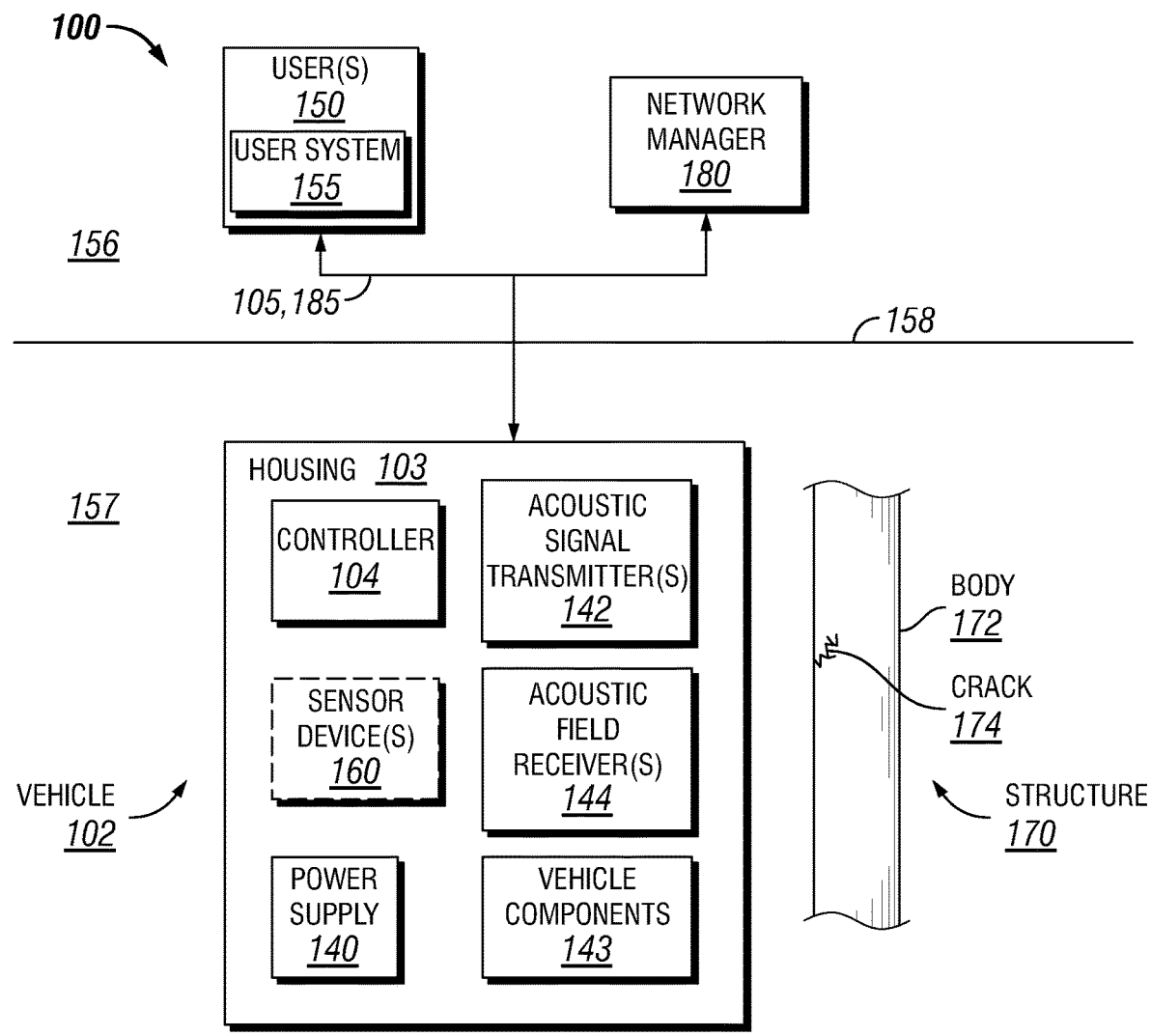
FIG. 1 shows a diagram of a system for detecting surface cracks using acoustic signals in accordance with certain example embodiments.

The example embodiments discussed herein are directed to systems, methods, and devices for detecting surface cracks using acoustic signals. While example embodiments are described herein as being used to detect cracks in structures that are disposed underwater, example embodiments can also be used to detect cracks in structures that are disposed in other types of fluids. Such other types of fluids can be in liquid and/or gas form. Further, example embodiments can be used to detect cracks in structures that are used in any of a number of industries and applications, including but not limited to hydrocarbon exploration and production, water extraction, formation fracturing, and mining. Example embodiments can be used in any type of environment (e.g., indoor, outdoor, submersible, hazardous, non-hazardous, high humidity, low temperature, corrosive, sterile, high vibration).

In certain example embodiments, vessels used to position transmitters and receivers, as well as the structures undergoing tests to detect cracks, are subject to meeting certain standards and/or regulations. Examples of entities that create such standards and regulations can include, but are not limited to, the National Electric Code (NEC), Underwriters Laboratory (UL), the National Electrical Manufacturers Association (NEMA), the International Electrotechnical Commission (IEC), the Society of Petroleum Engineers, the American Petroleum Institute (API), the International Standards Organization (ISO), and the Occupational Safety and Health Administration (OSHA), and the Institute of Electrical and Electronics Engineers (IEEE). Use of example embodiments described herein allow for the compliance of such standards and/or regulations when required.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of detecting surface cracks using acoustic signals will be described more fully hereinafter with reference to the accompanying drawings, in which example embodiments of detecting surface cracks using acoustic signals are shown. Detecting surface cracks using acoustic signals may, however, be embodied in many different forms and should not be construed as limited to the example embodiments set forth herein. Rather, these example embodiments are provided so that this disclosure will be thorough and complete, and will fully convey the scope of detecting surface cracks using acoustic signals to those of ordinary skill in the art. Like, but not necessarily the same, elements (also sometimes called components) in the various figures are denoted by like reference numerals for consistency.

Terms such as "first", "second", "distal", "proximal", "on", "upon", "outer", "inner", "top", "bottom", and "within" are used merely to distinguish one component (or part of a component or state of a component) from another. Such terms are not meant to denote a preference or a particular orientation. Such terms are not meant to limit embodiments of detecting surface cracks using acoustic signals. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 for detecting surface cracks using acoustic signals in accordance with certain example embodiments. The system 100 in this case includes a vehicle 102, a structure 170, a network manager 180, and one or more users 150. The vehicle 102 and the structure 170 (or portions thereof being tested) are submerged underwater 157. In this case, the network manager and the users 150 are located in an above-water environment 156 (e.g., on a platform). The waterline 158 sets the boundary between underwater 157 and the above-water environment 156. The components shown in the system 100 of FIG. 1 are not exhaustive, and in some embodiments, one or more of the components shown in FIG. 1 may not be included in an example system 100. Any component of the example system 100 can be discrete or combined with one or more other components of the system 100. For example, the controller 104 can be part of the power supply 140. As another example, the controller 104 can be located in an operation room in the above-water environment 156 rather than as part of the vehicle 102.

The structure 170 (or portions thereof) can be hundreds or even thousands of feet underwater 157. Detecting cracks 174 in the body 172 of the structure 170 can be difficult to detect using known technologies underwater 157, particularly the deeper underwater 157 the structure 170 is located. Example embodiments can be used to detect cracks 174 in the body 172 of the structure 170 while underwater 157. While cracks 174 in the body 172 of the structure 170 can be found within a weld in the body 174, cracks 174 can also be found in other parts of the body 172 of the structure 170, including but not limited to an elbow, an end, and a linear section. Cracks 174 can form for any of a number of reasons, including but not limited to corrosion, fatigue, vibration, and stress.

As discussed above, a structure 170 (or portion thereof) can be made of one or more of any of a number of materials (e.g., stainless steel, galvanized aluminum) in which cracks 174 can form. Examples of a structure 170 can include, but are not limited to, a jack-up rig, a semi-submersible rig, a tension leg platform, an oil offloading line, a steel catenary riser (SCR), a truss spar structure, and a fixed offshore structure. While a portion of a structure 170 can be disposed in the above-water environment 156, at least a portion of the structure 170 is disposed underwater 157. Underwater 157 can be any type of water, including but not limited to brackish water, saltwater, and fresh water. In some cases, underwater 157 can refer to any type of liquid.

The vehicle 102 is designed to carry the acoustic signal transmitter 142 and the acoustic field receiver 144. The combination of the acoustic signal transmitters 142 and the acoustic field receivers 144 can collectively be called an elastic non-linear diagnostics (END) system. In addition, the vehicle 102 is designed to position the acoustic signal transmitter 142 and the acoustic field receiver 144 relative to a portion of the structure 170 in order to perform steps used to determine whether cracks 174 are in the body 172 of the structure 170.

The vehicle 102 can be movable. In addition, the vehicle 102 can move and/or maintain its position proximate to the structure 170 without physically contacting the structure 170. The vehicle 102 can be manned (e.g., by a human pilot) or remotely controlled. The vehicle 102 can take any of a number of forms, including but not limited to an underwater remotely-operated vehicle (ROV), a drone, and a submarine. In some cases, the system 100 can include multiple vehicles 102 that operate at the same time on different portions of the structure 170.

The vehicle 102 can include one or more of a number of components. For example, in this case, the vehicle 102 includes one or more acoustic signal transmitters 142, one or more acoustic field receivers 144, a controller 104, a power supply 140, one or more vehicle components 143, and one or more optional sensor devices 160. The vehicle 102 can include a housing 103. The housing 103 can include at least one wall that forms a cavity. In some cases, the housing 103 can be designed to comply with any applicable standards so that the vehicle 102 can be located in a particular environment (e.g., submersible, high pressure).

Figure 2:
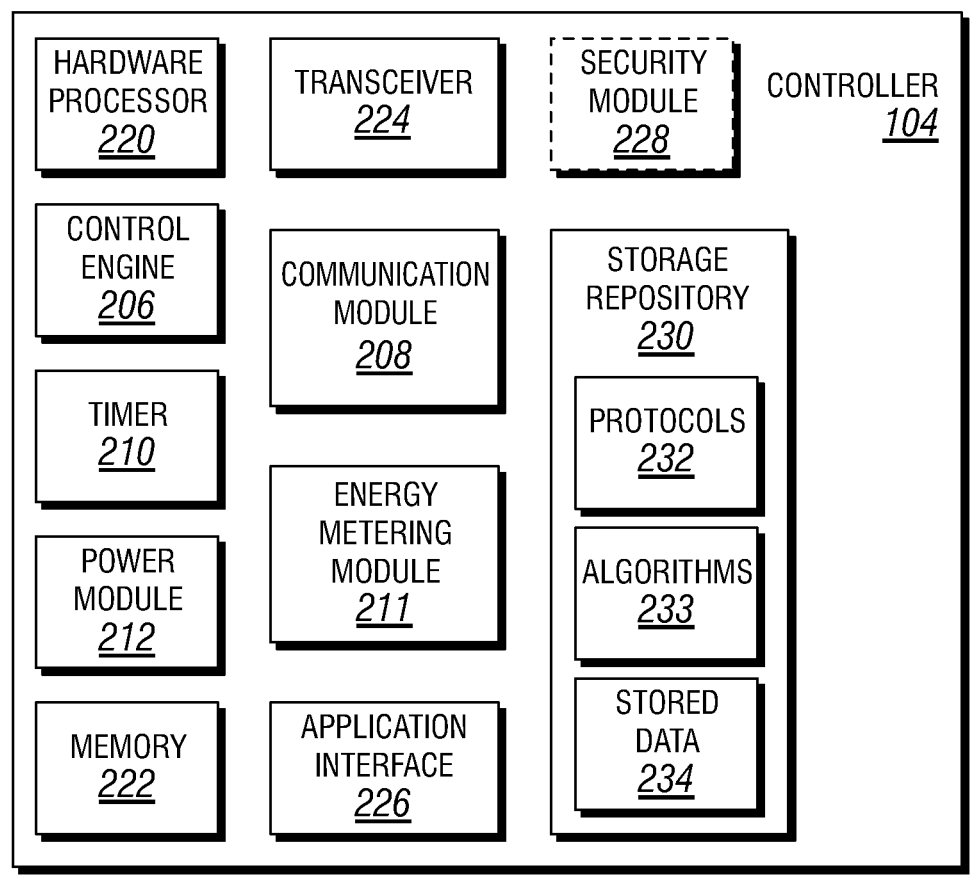
FIG. 2 show a diagram of the controller of FIG. 1.

The housing 103 of the vehicle 102 can be used to house one or more components of the vehicle 102, including one or more components of the controller 104. The controller 104 (which in this case includes the control engine 206, the communication module 208, the timer 210, the power module 212, the storage repository 230, the hardware processor 220, the memory 222, the transceiver 224, the application interface 226, and the optional security module 228, as shown in FIG. 2 below), the one or more sensor devices 160, the one or more acoustic signal transmitters 142, the one or more acoustic field receivers 144, the power supply 140, and the vehicle components 143 can be disposed in the cavity 101 formed by the housing 103, on the housing 103, and/or remotely from the housing 103. For example, the acoustic signal transmitter 142 and the acoustic field receiver 144 can be disposed on the housing 103 of the vehicle 102.

The power supply 140 of the vehicle 102 provides power to various components (e.g., the controller 104, the acoustic signal transmitters 142, the acoustic field receivers 144, the vehicle components 143) of the vehicle 102. The power supply 140 can include one or more components (e.g., a generator, a transformer, a motor control center, protective relays, fuses, contactors). The power supply 140 can include one or more of a number of single or multiple discrete components (e.g., transistor, diode, resistor), and/or a microprocessor. In some cases, the power supply 140 can include a printed circuit board, upon which the microprocessor and/or one or more discrete components are positioned.

A power supply 140 can include one or more components (e.g., a transformer, a diode bridge, an inverter, a converter) that receives power (for example, through an electrical cable) from a separate source of power (e.g., a battery, a generator) and generates power of a type (e.g., alternating current, direct current) and level (e.g., 12V, 24V, 120V, 480V, 4160V) that can be used by the controller 104, the acoustic signal transmitters 142, the acoustic field receivers 144, the vehicle components 143, and/or any other components of the vehicle 102. In addition, or in the alternative, a power supply 140 can be or include a source of power in itself. For example, a power supply 140 can be or include a battery, a supercapacitor, a photovoltaic solar generating system, or some other source of independent power. The power supply 140 can also include one or more components (e.g., a switch, a relay, a transceiver, a communication module) that allow the power supply 140 to communicate with and/or follow instructions from a user 150 (including an associated user system 155), the controller 104, one or more sensor devices 160, the network manager 180, and/or other components of the system 100.

The one or more example sensor devices 160 (also called sensor modules 160 herein) can include one or more sensors that measure one or more parameters. Examples of types of a sensor of a sensor device 160 can include, but are not limited to, a passive infrared sensor, a pressure sensor, an air flow monitor, a fluid signal monitor, a fluid level detector, a vibration sensor, a gas detector, a voltmeter, an ammeter, a camera, and a resistance temperature detector. Examples of a parameter measured by a sensor of a sensor module 160 can include, but are not limited to, proximity, a distance, a frequency of a signal, an amplitude of a signal, occupancy, motion, fluid motion, vibration, a current, a voltage, a temperature, a pressure, air flow, and an amount of energy.

A sensor device 160 can be integrated. An integrated sensor device 160 has the ability to sense and measure at least one parameter, and also the ability to directly communicate with at least one other component (e.g., the controller 104, the network manager 180, a user system 155) of the system 100. The communication capability of an integrated sensor device 160 can include one or more communication devices that are configured to communicate with, for example, the controller 104 and/or the network manager 180.

Each integrated sensor device 160 can use one or more of a number of communication protocols. This allows an integrated sensor device 160 to communicate with one or more components (e.g., the controller 104, a user system 155, one or more other integrated sensor devices 160) of the system 100. The communication capability of an integrated sensor device 160 can be dedicated to the sensor device 160 and/or shared with the controller 104 or some other component of the vehicle 102. When the vehicle 102 includes multiple integrated sensor devices 160, one integrated sensor device 160 can communicate, directly or indirectly, with one or more of the other integrated sensor devices 160. If the communication capability of an integrated sensor device 160 is dedicated to the sensor device 160, then the integrated sensor device 160 can include one or more components (e.g., a transceiver, a communication module), or portions thereof, that are substantially similar to the corresponding components described below in FIG. 2 with respect to the controller 104.

In certain example embodiments, a sensor module 160 can include an energy storage device (e.g., a battery) that is used to provide power, at least in part, to some or all of the sensor module 160. The energy storage device of the sensor module 160 can operate at all times or only when a primary source of power to the sensor module 160 is interrupted. In some cases, a sensor module 160 can utilize or include one or more components (e.g., memory, storage repository, transceiver) found in the controller 104. In such a case, the controller 104 can provide the functionality of these components used by the sensor module 160. Alternatively, as with an integrated sensor module 160, a sensor module 160 can include, either on its own or in shared responsibility with the controller 104 or other component of the vehicle 102, one or more of the components of the controller 104, or other component of the system 100. In such a case, the sensor module 160 can correspond to a computer system as described below with regard to FIG. 3.

Each acoustic signal transmitter 142 of the vehicle 102 is configured to emit acoustic signals. The acoustic signals emitted by an acoustic signal transmitter 142 can be directed in a specific direction, directed within a certain range of directions, or broadcast broadly. Also, the acoustic signals emitted by an acoustic signal transmitter 142 can be at a specific frequency (e.g., 100 kHz) and/or amplitude or within a range of frequencies (e.g., 50 kHz to 200 kHz) and/or amplitudes. Further, the orientation (e.g., tilt, rotation) of the acoustic signal transmitter 142 relative to the housing 103 of the vehicle 102 can be fixed or adjustable. In certain example embodiments, each acoustic signal transmitter 142 is disposed proximate to, but without physically contacting, the structure 170 (or portion thereof) when emitting acoustic signals. In alternative embodiments, one or more of the acoustic signal transmitters 142 can be disposed on (in physical contact with) the structure 170 (or portion thereof) when emitting acoustic signals. In either case, the acoustic signals penetrate the cracks 174 and other parts of the body 172 of the structure 170, resulting in an acoustic field that emanates off of the structure 170. This resulting acoustic field is measured by the acoustic field receiver 144.

These various aspects (e.g., characteristics (e.g., frequency, amplitude) of the acoustic signals emitted by an acoustic signal transmitter 142, orientation of the acoustic signal transmitter 142, direction of emission) of the acoustic signal transmitter 142 can be controlled in any of a number of ways. For example, the controller 104 (e.g., automatically using algorithms and/or protocols (discussed below), under instructions from the network manager 180 and/or a user system 155) of the vehicle 102 can control one or more of the aspects of the acoustic signal transmitter 142. As another example, the network manager 180 and/or a user system 155 can remotely and directly control one or more aspects of the acoustic signal transmitter 142. As yet another example, if the vehicle 102 is capable of transporting one or more users 150, a user 150 can directly control one or more aspects of the acoustic signal transmitter 142.

Each acoustic field receiver 144 of the vehicle 102 is configured to receive a resulting acoustic field that emanates off of the structure 170. A resulting acoustic field measured by an acoustic field receiver 144 can be received from a specific direction, received from within a certain range of directions, or received from every direction. Also, the resulting acoustic field measured by an acoustic field receiver 144 can be at a specific frequency (e.g., 100 kHz) and/or amplitude or within a range of frequencies (e.g., 50 kHz to 200 kHz) and/or amplitudes. Further, the orientation (e.g., tilt, rotation) of the acoustic field receiver 144 relative to the housing 103 of the vehicle 102 can be fixed or adjustable. In certain example embodiments, each acoustic field receiver 144 is disposed proximate to, but without physically contacting, the structure 170 (or portion thereof) when measuring a resulting acoustic field. This allows the acoustic signals emitted by an acoustic signal transmitter 142 to penetrate and propagate through the cracks 174 and other parts of the body 172 of the structure 170. By avoiding direct physical contact with the structure 170, the acoustic field receiver 144 can accurately measure the resulting acoustic field.

Many material defects in the structure 170 lead to nonlinear effects during the propagation of finite-amplitude elastic (e.g., acoustic) waves, manifested as wave distortions in the time domain or generation of harmonics in the frequency domain. Unlike techniques relying on the linear scattering of an elastic wave by a defect, these effects may be observed even when the wavelength is much larger (by orders of magnitude) than the defects.

This fact is of practical importance for nondestructive testing applications, such as what is described herein, for the early detection of defects (e.g., cracks 174) in the structure 170. In some cases, nonlinear signatures are far more sensitive to the presence of microscopic-sized defects (e.g., cracks 174), which are precursors to larger defects and eventually system failure, than linear signatures, including linear scattering, changes in the propagation speed of the elastic waves, and linear attenuation. In other words, example embodiments are able to detect small cracks 174 in the underwater structure 170, where methods of crack detection used in the current art are ineffective in performing the same function.

In some cases, an acoustic field receiver 144 is or includes a laser Doppler vibrometer that measures the resulting acoustic field emanating from the surface of the body 172 of the structure 170. The harmonic generation resulting from the interaction between a crack 174 and the acoustic signals (also sometimes called acoustic waves) emitted by the acoustic signal transmitter 142 is a non-linear process that occurs when the wave amplitude is sufficiently large. The crack 174 opens and closes (claps) when the acoustic wave travels through the crack 174.

As a result, this interaction between the crack 174 and the acoustic waves results in the emission of additional frequency components that were not present in the original acoustic signals emitted by the acoustic signal transmitter 142. This phenomenon can be more pronounced with cracks 174 that are mostly or completely closed. These closed cracks 174 happen to be the early stage of a development cycle for a crack 174, and so example embodiments are well suited for detecting cracks 174 early in development so that corrective action can be taken early, before significant damage can result to the structure 170. The acoustic field receiver 144 measures the base frequency and the additional frequency components of the resulting acoustic field.

These various aspects (e.g., characteristics (e.g., frequency, amplitude) of the resulting acoustic field measured by an acoustic field receiver 144, orientation of the acoustic field receiver 144, direction of receipt) of the acoustic field receiver 144 can be controlled in any of a number of ways. For example, the controller 104 (e.g., automatically using algorithms and/or protocols (discussed below), under instructions from the network manager 180 and/or a user system 155) of the vehicle 102 can control one or more of the aspects of the acoustic field receiver 144. As another example, the network manager 180 and/or a user system 155 can remotely and directly control one or more aspects of the acoustic field receiver 144. As yet another example, if the vehicle 102 is capable of transporting one or more users 150, a user 150 can directly control one or more aspects of the acoustic field receiver 144.

The vehicle components 143 are any components that are used to operate the vehicle 102 independent of the acoustic signal transmitter 142 and the acoustic field receiver 144. A vehicle component 143 can be mechanical, electrical, electromechanical, or electronic. Examples of a vehicle component 143 can include, but are not limited to, a propulsion system (e.g., a pump, a motor, wheels, an engine), a local controller, seals, fans, seats, a steering system, local sensors, and gauges.

The controller 104 of the vehicle 102 controls, at least, the one or more acoustic signal transmitters 142 and the one or more acoustic field receivers 144. The controller 104 can, in some cases, also control one or more components of the vehicle 102, such as one or more sensor devices 160 and/or one or more of the vehicle components 143. The controller 104 can interact with (e.g., communicate using control signals, communicate using data signals) the network manager 180 and/or a user system 155 of one or more users 150 using the communication links 105 and/or power transfer links 185. The controller 104 of the vehicle 102 controls the vehicle 102 so that the vehicle 102 is disposed proximate to, but without physically contacting, the structure 170 (or portion thereof) while the acoustic signal transmitters 142 emit acoustic signals and while the acoustic field receivers 144 measures the resulting acoustic fields.

Each communication link 105 and each power transfer link 185 can include wired (e.g., Class 1 electrical cables, Class 2 electrical cables, electrical connectors, power line carrier, RS485) and/or wireless (e.g., Wi-Fi, visible light communication, cellular networking, Bluetooth, Bluetooth Low Energy (BLE), Ultra Wideband (UWB), ISA100) technology. For example, a communication link 105 can be (or include) one or more electrical conductors that are coupled to the controller 104 and to the network manager 180.

Each communication link 105 can transmit signals (e.g., communication signals, control signals, data) between two or more components of the system 100. Similarly, a power transfer link 185 can transmit power between two or more components of the system 100. One or more communication links 105 and/or one or more power transfer links 185 can also transmit signals and power, respectively, within a component (e.g., the controller 104, the power supply 140) of the system 100.

The network manager 180 is a device or component that controls all or a portion of a communication network, control network, and/or power distribution network within the system 100. The network manager 180 can also directly or indirectly control one or more components (e.g., the controller 104) of the system 100, or portions thereof, using the communication network. The network manager 180 can be substantially similar to the controller 104. Alternatively, the network manager 180 can include one or more of a number of features in addition to, or altered from, the features of the controller 104 described below. In some cases, the network manager 180 can be called by a number of other names known in the art, including but not limited to an insight manager, a master controller, a gateway, and a network controller.

A user 150 can be any person that interacts with the controller 104 (and/or other portion of the vehicle 102), the network manager 180, and/or any other components of the system 100. Examples of a user 150 may include, but are not limited to, a company representative, a site manager, an engineer, a driller, an electrician, an instrumentation and controls technician, a service employee, an operator, a consultant, a contractor, and a manufacturer's representative. A user 150 can use one or more of a number of user systems 155 (sometimes also called user devices 155), which may include a display (e.g., a GUI). Examples of a user system 155 can include, but are not limited to, a cell phone, a laptop computer, an electronic tablet, and a desktop computer. A user system 155 can send and receive communication signals using the communication links 105.

A user 150 (including an associated user system 155) can interact with (e.g., send data to, receive data from) the controller 104 via an application interface (described below). In some cases, the system 100 can include multiple vessels 102, multiple controllers 104, multiple sensor devices 160, and/or multiples of other components of the system 100. In such a case, a user 150 (including an associated user system 155) can also interact with those additional components, and the additional components can be configured to communicate, directly or indirectly, with each other.

FIG. 2 shows an example of the controller 104 of FIG. 1. The controller 104 can include one or more of a number of components. As shown in FIG. 2, such components can include, but are not limited to, a control engine 206, a communication module 208, a timer 210, an energy metering module 211, a power module 212, a storage repository 230, a hardware processor 220, a memory 222, a transceiver 224, an application interface 226, and, optionally, a security module 228. The components shown in FIG. 2 are not exhaustive, and in some embodiments, one or more of the components shown in FIG. 2 may not be included in the controller 104.

Any component of the controller 104 can be discrete or combined with one or more other components of the controller 104. For example, the controller 104 can include one or more switches. Alternatively, the transceiver can include switches. As another example, the energy metering module 211 can be an optional feature.

A user 150 (including an associated user system 155), the network manager 180, and/or the sensor devices 160 can interact with the controller 104 using the application interface 226 in accordance with one or more example embodiments. Specifically, the application interface 226 of the controller 104 receives data (e.g., information, communications, instructions, updates to firmware) from and sends data (e.g., information, communications, instructions) to a user 150 (including an associated user system 155), the network manager 180, and/or each sensor device 160.

A user 150 (including an associated user system 155), the network manager 180, and/or each sensor device 160 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104 (and/or other components of a vehicle 102), a user 150 (including an associated user system 155), the network manager 180, and/or the sensor devices 160 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 3.

Further, as discussed above, such a system can have corresponding software (e.g., user system software, sensor device software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The controller 104 can be a stand-alone component of the vehicle 102. Alternatively, the controller 104 can be integrated with another component (e.g., the power supply 140, the acoustic field receiver 144, a vehicle component 143) of the vehicle 143. In such a case, the controller 104 can also perform other functions and/or include other modules aside from those shown in FIG. 2.

The storage repository 230 of the controller 104 can be a persistent storage device (or set of devices) that stores software and data used to assist the controller 104 in communicating with one or more other components of the system 100. In one or more example embodiments, the storage repository 230 stores one or more protocols 232, one or more algorithms 233, and stored data 234. The protocols 232 can be any procedures (e.g., a series of method steps), logic steps, and/or other similar operational procedures that the control engine 206 of the controller 104 follows based on certain conditions at a point in time.

The protocols 232 can also include any of a number of communication protocols 232 that are used to send and/or receive data between the controller 104 and one or more other components of the system 100. One or more of the protocols 232 used for communication can be a time-synchronized protocol. Examples of such time-synchronized protocols can include, but are not limited to, a highway addressable remote transducer (HART) protocol, a wirelessHART protocol, and an International Society of Automation (ISA) 100 protocol.

In this way, one or more of the protocols 232 used for communication can provide a layer of security to the data transferred within the system 100. Other protocols 232 used for communication can be associated with the use of Wi-Fi, Zigbee, visible light communication, cellular networking, ultra-wideband (UWB), Bluetooth Low Energy (BLE), and Bluetooth. One or more protocols 232 can facilitate communication between an acoustic field receiver 144 and/or an acoustic signal transmitter 142 and the control engine 206 of the controller 104.

The algorithms 233 can be any formulas, mathematical models, forecasts, simulations, and/or other similar computational instruments that the control engine 206 of the controller 104 utilizes based on certain conditions at a point in time. One or more algorithms 233 can be used in conjunction with, or as a result of following, one or more protocols 232. Algorithms 233 and/or protocols 232 can be focused on certain components of the system 100. For example, one or more protocols 232 and/or one or more algorithms 233 can use information (e.g., frequencies, magnitudes) derived from the resulting acoustic field measured by an acoustic field receiver 144 and/or acoustic signals emitted by an acoustic signal transmitter 142.

As another example, one or more protocols 232 and/or one or more algorithms 233 can use parameters measured by one or more sensor devices 160. As a specific example, a protocol 232 can be used by the control engine 206 to instruct a sensor device 160 to measure a parameter (e.g., an amount of vibration, a distance from the structure 170), for the sensor device 160 to send the measurement to the control engine 206, for the control engine 206 to analyze the measurement using one or more algorithms 233, and for the control engine 206 to take an action (e.g., increase the frequency of the acoustic signals output by an acoustic signal transmitter 142, move the vehicle 102 to a different position relative to the structure 170) based on the result (stored as stored data 234) of the algorithm 233.

Stored data 234 can be any data associated with the system 100 (including any components thereof), the characteristics of the acoustic signals emitted by an acoustic signal transmitter 142, the characteristics of the resulting acoustic field measured by an acoustic field receiver 144, any measurements taken by the sensor devices 160, measurements taken by the energy metering module 211, threshold values, tables, user preferences and settings, results of previously run or calculated algorithms 232, and/or any other suitable data. Such data can be any type of data, including but not limited to historical data (e.g., historical data with respect to the structure 170, historical data with respect to other structures, historical data with respect to the acoustic field receiver 144, historical data with respect to the acoustic signal transmitter 142), present data, and future data (e.g., forecasts). The stored data 234 can be associated with some measurement of time derived, for example, from the timer 210.

Examples of a storage repository 230 can include, but are not limited to, a database (or a number of databases), a file system, a hard drive, flash memory, cloud-based storage, some other form of solid state data storage, or any suitable combination thereof. The storage repository 230 can be located on multiple physical machines, each storing all or a portion of the protocols 232, the algorithms 233, and/or the stored data 234 according to some example embodiments. Each storage unit or device can be physically located in the same or in a different geographic location.

The storage repository 230 can be operatively connected to the control engine 206. In one or more example embodiments, the control engine 206 includes functionality to communicate with one or more other components of the system 100. More specifically, the control engine 206 sends information to and/or receives information from the storage repository 230 in order to communicate with one or more other components of the system 100. As discussed below, the storage repository 230 can also be operatively connected to the communication module 208 in certain example embodiments.

In certain example embodiments, the control engine 206 of the controller 104 controls the operation of one or more components (e.g., the communication module 208, the timer 210, the transceiver 224) of the controller 104. For example, the control engine 206 can activate the communication module 208 when the communication module 208 is in "sleep" mode and when the communication module 208 is needed to send data received from another component (e.g., a sensor device 160, a user system 155 of a user 150) in the system 100.

As another example, the control engine 206 can acquire the current time using the timer 210. The timer 210 can enable the controller 104 to control one or more components of the system 100 even when the controller 104 has no communication with the network manager 180. As yet another example, the control engine 206 can determine (e.g., based on measurements made by one or more sensor modules 260, based on time tracked by the timer 210, based on instructions received from a user 250) when one or more of the sonication devices 245 should be operated in a particular way at a particular point in time so that the fluid 299 in a corresponding vessel 202 undergoes sonication.

The control engine 206 of the controller 104 can control (e.g., based on instructions from a user 150 or user system 155, based on instructions from the network manger 180, based on one or more protocols 232 and/or algorithms 233) the power supply 140 (or portions thereof) in any of a number of ways. The control engine 206 of the controller 104 can also control (e.g., based on instructions from a user 150 or user system 155, based on instructions from the network manger 180, based on one or more protocols 232 and/or algorithms 233) an acoustic signal transmitter 142 and/or an acoustic field receiver 143, including any associated operating parameters (e.g., adjust the frequency and/or amplitude of the acoustic signals emitted by the acoustic signal transmitter 142, control the range of frequencies (e.g., to capture 4 harmonic frequencies) of a resulting acoustic field measured by an acoustic field receiver 144).

The control engine 206 can use one or more protocols 232 and/or one or more algorithms 233 to determine whether a parameter (e.g., a distance between an acoustic signal generator 142 and the structure 170, a distance between an acoustic field receiver 144 and the structure 170, the frequency of acoustic signals emitted by the acoustic signal generator 142) measured by a sensor device 160 falls below or exceeds some threshold value (part of the stored data 234). In such a case, the control engine 206 of the controller 104 can instruct one or more components (e.g., an acoustic signal generator 142, an acoustic field receiver 144) of the system 100 to operate in a particular way.

The control engine 206 of the controller 104 can communicate with one or more of the example sensor devices 160 and make determinations based on measurements made by the example sensor devices 160. For example, the control engine 206 can use one or more protocols 232 and/or algorithms 233 to facilitate communication with a sensor device 160. As a specific example, the control engine 206 can use one or more protocols 232 to instruct a sensor device 160 to measure a parameter, for the sensor device 160 to send the measurement to the control engine 206, for the control engine 206 to analyze, using one or more algorithms 233, the measurement, (stored as stored data 234), and for the control engine 206 to take an action (e.g., instruct, using a protocol 232, one or more other components (e.g., an acoustic signal transmitter 142, an acoustic field receiver 144) of the system 100 to operate or change state) based on the result (stored as stored data 234) of the analysis.

In some cases, the control engine 206 of the controller 104 can control, directly or indirectly, one or more vehicle components 143 to operate so that the vehicle 102 moves. Such control can instruct the vehicle 102, for example, to move from one stationary position to another stationary position, to move continuously along a path at a particular speed, and to bring the vehicle 102 to the waterline 158.

The control engine 206 of the controller 104 can use one or more protocols 232 and/or one or more algorithms 233 to analyze the resulting acoustic field measured by an acoustic field receiver 144. Through this analysis, the control engine 206 can determine whether one or more cracks 174 are in the body 172 of the structure 170. In some cases, the control engine 206 can further use this data to determine the location and/or other characteristics (e.g., length, depth, width, linearity) of any cracks 174.

The control engine 206 can also send and/or receive communications. As a specific example, the control engine 206 can use one or more algorithms 233 to receive (using a protocol 232) a signal, for the control engine 206 to analyze the signal, and for the control engine 206 to take an action based on the result of the analysis. As another specific example, the control engine 206 can use one or more protocols 232 and/or algorithms 233 to determine that a communication to a device or component (e.g., a user 150) within or external to the system 100 needs to be sent, and to send a communication signal (using a protocol 232 and saved as stored data 234).

When the control engine 206 receives the measurement of certain parameters from one or more sensor devices 160 and/or resulting acoustic fields measurements from an acoustic field receiver 144, the control engine 206 can follow one or more protocols 232 to perform one or more tasks (e.g., analyze resulting acoustic field measurements, move the vehicle, change the frequency of acoustic signals emitted by an acoustic signal transmitter 142). In some cases, the control engine 206 can make adjustments to one or more protocols 232 and/or to one or more algorithms 233 based on comparing actual results with forecast values and/or previously-calculated values.

The control engine 206 can provide control, communication, and/or other similar signals to one or more other components of the system 100. Similarly, the control engine 206 can receive control, communication, and/or other similar signals from one or more other components of the system 100. The control engine 206 can control each acoustic signal transmitter 142, each acoustic field receiver 144, and each sensor device 160 automatically (for example, based on one or more protocols 232 stored in the storage repository 230) and/or based on control, communication, and/or other similar signals received from another component (e.g., the network manager 180) of the system 100 through a communication link 105. The control engine 206 may include a printed circuit board, upon which the hardware processor 220 and/or one or more discrete components of the controller 104 are positioned.

In certain embodiments, the control engine 206 of the controller 104 can communicate with one or more components of a system external to the system 100. For example, the control engine 206 can interact with an inventory management system by ordering and scheduling material and labor to repair one or more cracks 174 in the structure 170.

In this way, the controller 104 is capable of performing a number of functions beyond what could reasonably be considered a routine task.

In certain example embodiments, the control engine 206 can include an interface that enables the control engine 206 to communicate with one or more other components (e.g., the power supply 140, an acoustic field receiver 144, the network manager 180) of the system 100. For example, if the power supply 140 (or other component of the system 100) operates under IEC Standard 62386, then the power supply 140 (or other component of the system 100) can have a serial communication interface that will transfer data (e.g., stored data 234) measured by an acoustic field receiver 144 and/or a sensor device 160. In such a case, the control engine 206 can also include a serial interface to enable communication with the power supply 140 (or other component of the system 100). Such an interface can operate in conjunction with, or independently of, the protocols 232 used to communicate between the controller 104 and one or more other components of the system 100.

The control engine 206 (or other components of the controller 104) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The communication module 208 of the controller 104 determines and implements the communication protocol (e.g., from the protocols 232 of the storage repository 230) that is used when the control engine 206 communicates with (e.g., sends signals to, receives signals from) one or more other components of the system 100. In some cases, the communication module 208 accesses the stored data 234 to determine which protocol 232 is used to communicate with another component (e.g., an acoustic field receiver 144) of the system 100. In addition, the communication module 208 can interpret the communication protocol of a communication received by the controller 104 so that the control engine 206 can interpret the communication.

The communication module 208 can send and receive data between one or more components of the system 200 and the controller 104. The communication module 208 can send and/or receive data in a given format that follows a particular protocol 232. The control engine 206 can interpret the data packet received from the communication module 208 using the protocol 232 information stored in the storage repository 230. The control engine 206 can also facilitate the data transfer between one or more sensor devices 160, the network manager 180, and/or a user 150 (including an associated user system 155) by converting the data into a format understood by the communication module 208.

The communication module 208 can send data (e.g., protocols 232, algorithms 233, stored data 234, operational information, alarms) directly to and/or retrieve data directly from the storage repository 230. Alternatively, the control engine 206 can facilitate the transfer of data between the communication module 208 and the storage repository 230. The communication module 208 can also provide encryption to data that is sent by the controller 104 and decryption to data that is received by the controller 104. The communication module 208 can also provide one or more of a number of other services with respect to data sent from and received by the controller 104. Such services can include, but are not limited to, data packet routing information and procedures to follow in the event of data interruption.

The timer 210 of the controller 104 can track clock time, intervals of time, an amount of time, calendar time, and/or any other measure of time. The timer 210 can also count the number of occurrences of an event, whether with or without respect to time. Alternatively, the control engine 206 can perform the counting function. The timer 210 is able to track multiple time measurements concurrently. The timer 210 can track time periods based on an instruction received from the control engine 206, based on an instruction received from a user 150, based on an instruction programmed in the software for the controller 104, based on some other condition or from some other component, or from any combination thereof.

The timer 210 can be configured to track time when there is no power delivered to the controller 104 (e.g., the power module 212 malfunctions) using, for example, a super capacitor or a battery backup. In such a case, when there is a resumption of power delivery to the controller 104, the timer 210 can communicate any aspect of time to the controller 104. In such a case, the timer 210 can include one or more of a number of components (e.g., a super capacitor, an integrated circuit) to perform these functions. In some cases, time can be considered a parameter. In such a case, the timer 210 can be considered a type of sensor device 160.

The energy metering module 211 of the controller 104 measures one or more components of power (e.g., current, voltage, resistance, VARs, watts) at one or more points within the controller 104 and/or at any other component (e.g., an acoustic field receiver 144, an acoustic signal transmitter 142) of which the controller 104 may be coupled. The energy metering module 211 can include any of a number of measuring devices and related components, including but not limited to a voltmeter, an ammeter, a power meter, an ohmmeter, a current transformer, a potential transformer, and electrical wiring. The energy metering module 211 can measure a component of power continuously, periodically, based on the occurrence of an event, based on a command received from the control module 206, and/or based on some other factor. For purposes herein, the energy metering module 211 can be considered a type of sensor (e.g., sensor module 260). In this way, a component of power measured by the energy metering module 211 can be considered a parameter herein.

In certain example embodiments, the power module 212 of the controller 104 receives power from a source of power (e.g., the power supply 140) in the system 100 and manipulates (e.g., transforms, rectifies, inverts) that power to provide the manipulated power to one or more other components (e.g., timer 210, control engine 206) of the controller 104. The power module 212 can include one or more of a number of single or multiple discrete components (e.g., transistor, diode, resistor), and/or a microprocessor. The power module 212 may include a printed circuit board, upon which the microprocessor and/or one or more discrete components are positioned. In some cases, the power module 212 can include one or more components that allow the power module 212 to measure one or more elements of power (e.g., voltage, current) that is delivered to and/or sent from the power module 212.

The power module 212 can include one or more components (e.g., a transformer, a diode bridge, an inverter, a converter) that receives power (for example, through an electrical cable) from the power supply 140 and generates power of a type (e.g., alternating current, direct current) and level (e.g., 12V, 24V, 120V) that can be used by the other components of the controller 104. The power module 212 can use a closed control loop to maintain a preconfigured voltage or current with a tight tolerance at the output.

The power module 212 can also protect the rest of the electronics (e.g., hardware processor 220, transceiver 224) in the controller 104 from surges generated in the line. In addition, or in the alternative, the power module 212 can be or include a source of power in itself to provide signals to the other components of the controller 104. For example, the power module 212 can be or include a battery.

In certain example embodiments, the power module 212 of the controller 104 can also provide power and/or control signals, directly or indirectly, to one or more of the sensor devices 160. In such a case, the control engine 206 can direct the power generated by the power module 212 to the sensor devices 160. In this way, power can be conserved by sending power to the sensor devices 160 when those devices need power, as determined by the control engine 206.

The hardware processor 220 of the controller 104 executes software, algorithms, and firmware in accordance with one or more example embodiments. Specifically, the hardware processor 220 can execute software on the control engine 206 or any other portion of the controller 104, as well as software used by one or more other components of the system 100. The hardware processor 220 can be or include an integrated circuit, a central processing unit, a multi-core processing chip, SoC, a multi-chip module including multiple multi-core processing chips, or other hardware processor in one or more example embodiments. The hardware processor 220 is known by other names, including but not limited to a computer processor, a microprocessor, and a multi-core processor.

In one or more example embodiments, the hardware processor 220 executes software instructions stored in memory 222 of the controller 104. The memory 222 includes one or more cache memories, main memory, and/or any other suitable type of memory. The memory 222 can include volatile and/or non-volatile memory. The memory 222 is discretely located within the controller 104 relative to the hardware processor 220 according to some example embodiments. In certain configurations, the memory 222 can be integrated with the hardware processor 220.

In certain example embodiments, the controller 104 does not include a hardware processor 220. In such a case, the controller 104 can include, as an example, one or more field programmable gate arrays (FPGA), one or more insulated-gate bipolar transistors (IGBTs), one or more complex programmable logic devices (CPLDs), programmable array logics (PALs), one or more digital signal processors (DSPs), and one or more integrated circuits (ICs). Using FPGAs, IGBTs, CPLDs, PALs, DSPs, ICs, and/or other similar devices known in the art allows the controller 104 (or portions thereof) to be programmable and function according to certain logic rules and thresholds without the use of a hardware processor. Alternatively, FPGAs, IGBTs, CPLDs, PALs, DSPs, ICs, and/or similar devices can be used in conjunction with one or more hardware processors 220.

The transceiver 224 of the controller 104 can send and/or receive control and/or communication signals. Specifically, the transceiver 224 can be used to transfer data between the controller 104 and one or more other components of the system 100. The transceiver 224 can use wired and/or wireless technology. The transceiver 224 can be configured in such a way that the control and/or communication signals sent and/or received by the transceiver 224 can be received and/or sent by another transceiver that is part of one or more components of the system 100. The transceiver 224 can use any of a number of signal types, including but not limited to radio frequency signals.

When the transceiver 224 uses wireless technology, any type of wireless technology can be used by the transceiver 224 in sending and receiving signals. Such wireless technology can include, but is not limited to, Wi-Fi, Zigbee, visible light communication, cellular networking, UWB, BLE, and Bluetooth. The transceiver 224 can use one or more of any number of suitable communication protocols (e.g., ISA100, HART) when sending and/or receiving signals. Such communication protocols can be stored in the protocols 232 of the storage repository 230. Further, any transceiver information for one or more other components of the system 100 can be part of the stored data 234 (or similar areas) of the storage repository 230.

Optionally, in one or more example embodiments, the security module 228 secures interactions between the controller 104 and one or more other components of the system 100. More specifically, the security module 228 authenticates communication from software based on security keys verifying the identity of the source of the communication. For example, user software may be associated with a security key enabling the software of a user system 155 of a user 150 to interact with the controller 104 and/or the sensor modules 260. Further, the security module 228 can restrict receipt of information, requests for information, and/or access to information in some example embodiments.

Figure 3:
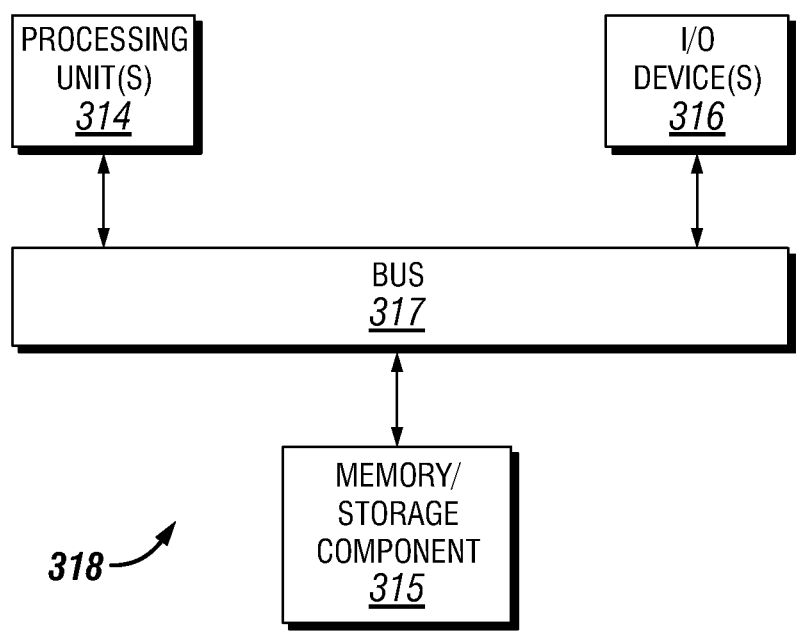
FIG. 3 shows a computing device in accordance with certain example embodiments.

FIG. 3 illustrates one embodiment of a computing device 318 that implements one or more of the various techniques described herein, and which is representative, in whole or in part, of the elements described herein pursuant to certain exemplary embodiments. For example, the controller 104 of FIG. 2 and its various components (e.g., hardware processor 220, memory 222, control engine 206) can be considered a computing device 318 as in FIG. 3. Computing device 318 is one example of a computing device and is not intended to suggest any limitation as to scope of use or functionality of the computing device and/or its possible architectures. Neither should computing device 318 be interpreted as having any dependency or requirement relating to any one or combination of components illustrated in the example computing device 318.

Computing device 318 includes one or more processors or processing units 314, one or more memory/storage components 315, one or more input/output (I/O) devices 316, and a bus 317 that allows the various components and devices to communicate with one another. Bus 317 represents one or more of any of several types of bus structures, including a memory bus or memory controller, a peripheral bus, an accelerated graphics port, and a processor or local bus using any of a variety of bus architectures. Bus 317 includes wired and/or wireless buses.

Memory/storage component 315 represents one or more computer storage media. Memory/storage component 315 includes volatile media (such as random access memory (RAM)) and/or nonvolatile media (such as read only memory (ROM), flash memory, optical disks, magnetic disks, and so forth). Memory/storage component 315 includes fixed media (e.g., RAM, ROM, a fixed hard drive, etc.) as well as removable media (e.g., a Flash memory drive, a removable hard drive, an optical disk, and so forth).

One or more I/O devices 316 allow a customer, utility, or other user to enter commands and information to computing device 318, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 318 is connected to a network (not shown) (e.g., a LAN, a WAN such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 318 includes at least the minimal processing, input, and/or output means necessary to practice one or more embodiments.

Further, those skilled in the art will appreciate that one or more elements of the aforementioned computer device 318 is located at a remote location and connected to the other elements over a network in certain exemplary embodiments. Further, one or more embodiments is implemented on a distributed system having one or more nodes, where each portion of the implementation (e.g., control engine 206) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 4A:
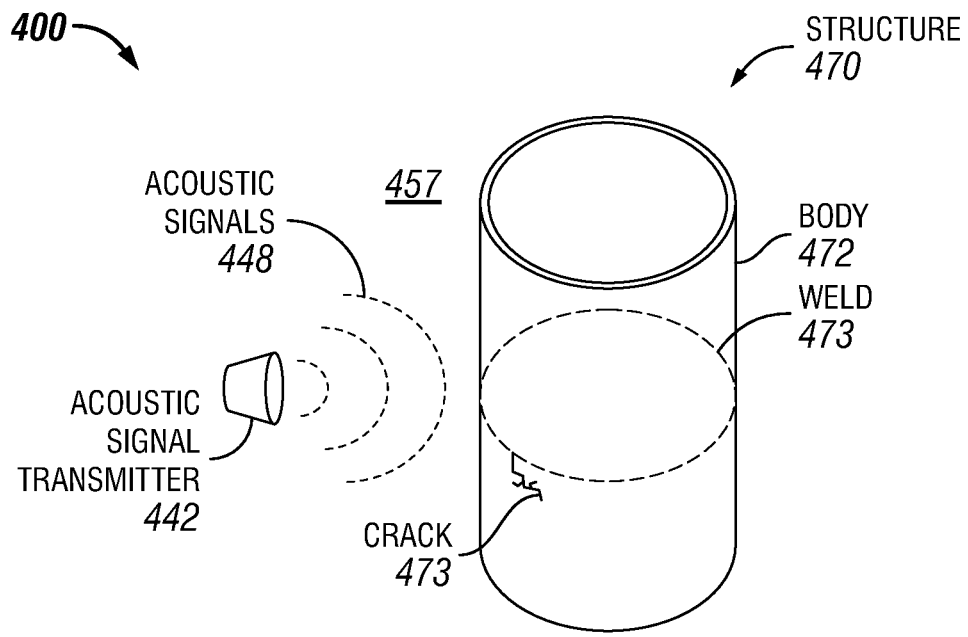
FIGS. 4A and 4B show an example of how an acoustic signal transmitter and an acoustic field receiver interact with a structure in accordance with certain example embodiments.
Figure 4B:
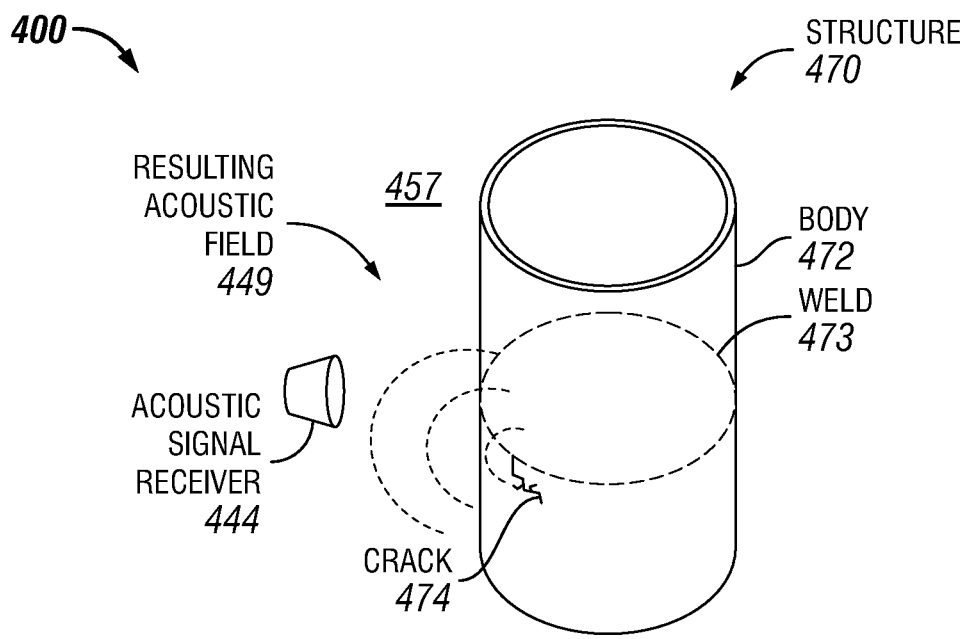

FIGS. 4A and 4B show an example of how an acoustic signal transmitter 442 and an acoustic field receiver 444 interact with a structure 470 in accordance with certain example embodiments. Specifically, FIG. 4A shows part of a system 400 in which an acoustic signal transmitter 442 interacts with the structure 470, and FIG. 4B shows part of the system 400 in which an acoustic field receiver 444 interacts with the structure 470. Referring to FIGS. 1 through 4B, the acoustic signal transmitter 442, the acoustic field receiver 444, and the structure 470 of FIGS. 4A and 4B are substantially the same as the acoustic signal transmitter 142, the acoustic field receiver 144, and the structure 170 of FIG. 1 above.

In FIG. 4A, the acoustic signal transmitter 442 is disposed proximate to, but without physically contacting, the structure 470 (or portion thereof) when emitting the acoustic signals 448. The acoustic signals 448 emitted by the acoustic signal transmitter 442 can be emitted continuously as long as the acoustic signal transmitter 442 is operating, emitted continuously for periods of time, emitted in discrete increments for some period of time, or under some other emission schedule. As discussed above, the characteristics (e.g., frequency, amplitude, emission schedule) of the acoustic signals 448 can be controlled by a controller (e.g., controller 104). At least some of the acoustic signals 448 are directed at the structure 470 (or portion thereof).

In this case, as is common with large structures, the structure 470 has one or more welds 473 in the body 472. These welds 473 are where cracks 474 can sometimes develop in structures 470. Because the portion of the structure 470 of FIGS. 4A and 4B is located underwater 457, detecting these cracks 474 without example embodiments can be difficult to detect, allowing the cracks 474 to become larger over time, threatening the integrity of the structure 470. In this case, the weld 473 continues around the outer perimeter (the girth) of the body 472 of the structure 470.

In FIG. 4B, the acoustic field receiver 444 is disposed proximate to, but without physically contacting, the structure 470 (or portion thereof) when receiving the resulting acoustic field 449, which emanates from the acoustic signals 448 traveling through the structure 470 (or portion thereof). The resulting acoustic fields 449 measured by the acoustic field receiver 444 can be received continuously as long as the acoustic field receiver 444 is operating, received continuously for periods of time, received in discrete increments for some period of time, or under some other receipt schedule. As discussed above, the acoustic field receiver 444 can be controlled by a controller (e.g., controller 104).

Figure 4C:
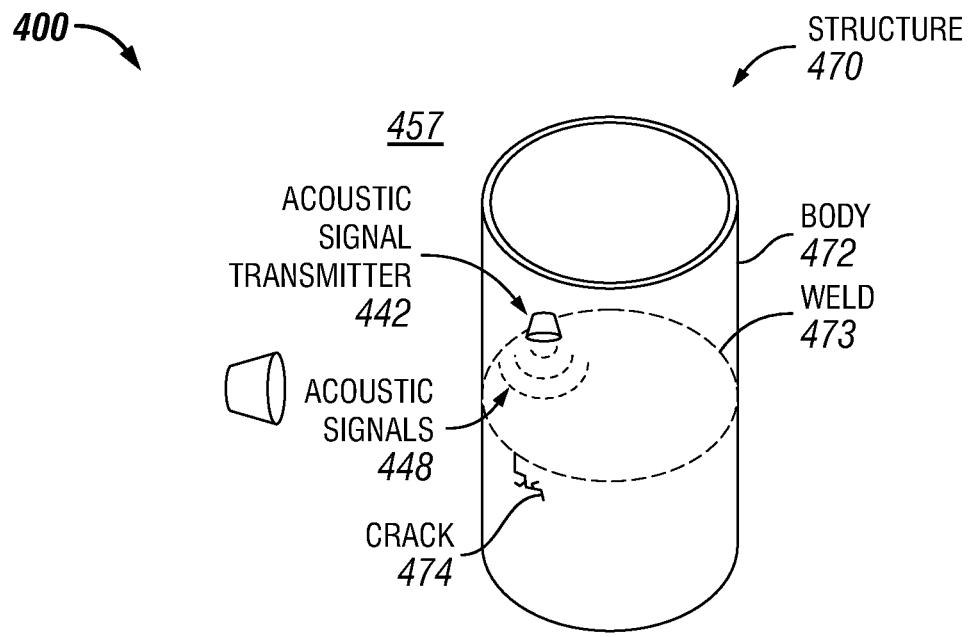
FIGS. 4C and 4D show another example of how an acoustic signal transmitter and an acoustic field receiver interact with a structure in accordance with certain example embodiments.
Figure 4D:
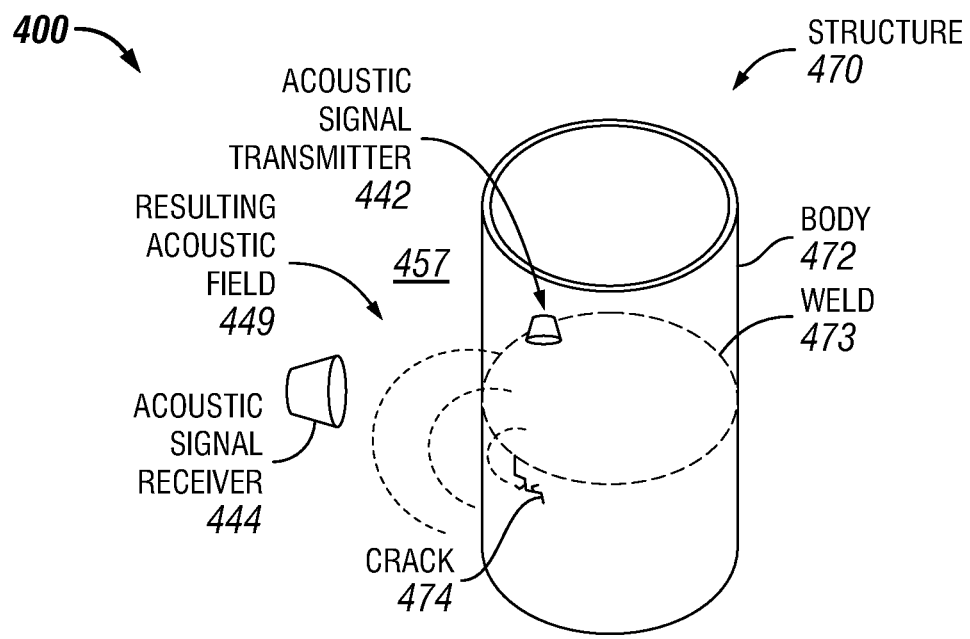

FIGS. 4C and 4D show another example of how an acoustic signal transmitter 442 and an acoustic field receiver 444 interact with a structure 470 in accordance with certain example embodiments. Specifically, FIG. 4C shows part of a system 400 in which an acoustic signal transmitter 442 interacts with the structure 470, and FIG. 4D shows part of the system 400 in which an acoustic field receiver 444 interacts with the structure 470. Referring to FIGS. 1 through 4D, the acoustic signal transmitter 442, the acoustic field receiver 444, and the structure 470 of FIGS. 4C and 4D are substantially the same as the acoustic signal transmitter 142, the acoustic field receiver 144, and the structure 170 of FIG. 1 above In FIG. 4C, the acoustic signal transmitter 442 is disposed (e.g., strapped, welded, magnetically coupled, mechanically coupled) on the structure 470 (or portion thereof) when emitting the acoustic signals 448. The acoustic signals 448 emitted by the acoustic signal transmitter 442 can be emitted continuously as long as the acoustic signal transmitter 442 is operating, emitted continuously for periods of time, emitted in discrete increments for some period of time, or under some other emission schedule. As discussed above, the characteristics (e.g., frequency, amplitude, emission schedule) of the acoustic signals 448 can be controlled by a controller (e.g., controller 104). At least some of the acoustic signals 448 travel along the structure 470 (or portion thereof).

In this case, as is common with large structures, the structure 470 has one or more welds 473 in the body 472. These welds 473 are where cracks 474 can sometimes develop in structures 470. While the portion of the structure 470 of FIGS. 4C and 4D is located underwater 457, in alternative embodiments the portion of the structure 470 can be located above water (e.g., in ambient air). Regardless of the environment, the cracks 474 can sometimes be difficult to detect, allowing the cracks 474 to become larger over time, threatening the integrity of the structure 470. In this case, the weld 473 continues around the outer perimeter (the girth) of the body 472 of the structure 470.

In FIG. 4D, the acoustic field receiver 444 is disposed proximate to, but without physically contacting, the structure 470 (or portion thereof) when receiving the resulting acoustic field 449, which emanates from the acoustic signals 448 traveling through the structure 470 (or portion thereof). The resulting acoustic fields 449 measured by the acoustic field receiver 444 can be received continuously as long as the acoustic field receiver 444 is operating, received continuously for periods of time, received in discrete increments for some period of time, or under some other receipt schedule. As discussed above, the acoustic field receiver 444 can be controlled by a controller (e.g., controller 104).

As discussed below, by analyzing the third harmonic of the resulting acoustic fields 449 using example embodiments, the existence of, and in some cases the location of, the crack 474 can be determined. Use of the third harmonic of the resulting acoustic fields 449 using example embodiments is a novel approach that can be applied to any environment (e.g., underwater, in a vacuum, in mud, in air) in which the acoustic field receiver 444 and the portion of the structure 470 happen to be located at the time of testing. Also, use of the third harmonic of the resulting acoustic fields 449 using example embodiments is a novel approach that can be applied regardless of whether the acoustic signal transmitter 442 is in physical contact with or is proximate to without physically touching the structure 470.

Figure 5:
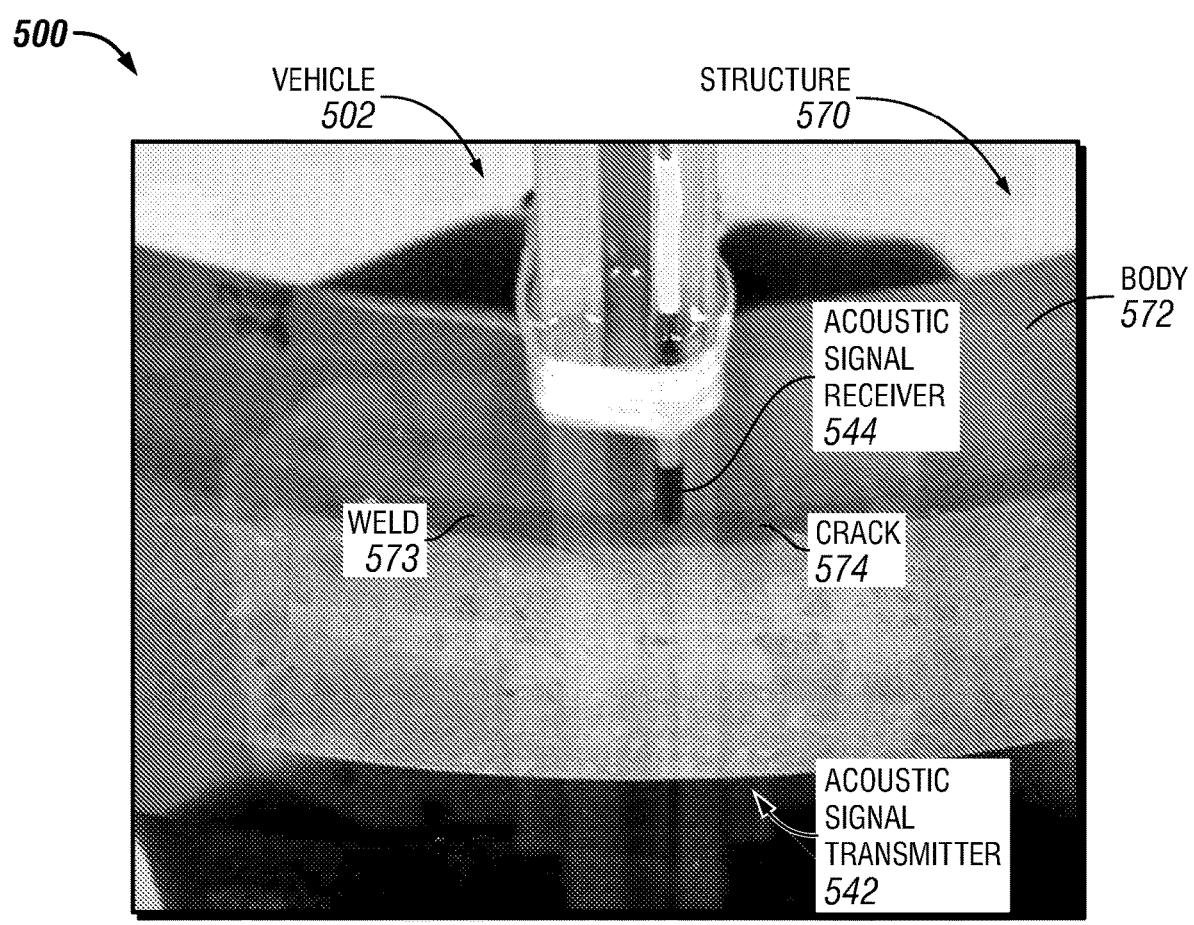
FIG. 5 shows another example of how an acoustic signal transmitter and an acoustic field receiver interact with a structure in accordance with certain example embodiments.

FIG. 5 shows another example of how an acoustic signal transmitter 542 and an acoustic field receiver 544 interact with a structure 570 in accordance with certain example embodiments. Referring to FIGS. 1 through 5, the acoustic signal transmitter 542, the acoustic field receiver 544, the vehicle 502, and the structure 570 of FIG. 5 are substantially the same as the acoustic signal transmitter 142, the acoustic field receiver 144, the vehicle 502, and the structure 170 of FIG. 1 above.

The system 500 of FIG. 5 shows a controlled environment where the vehicle 502 is a moving stage that adjusts the distance between the acoustic field receiver 544 and a top surface of the structure 570, as well as between the acoustic signal transmitter 542 and a bottom surface of the structure 570. The vehicle 502 also simultaneously moves the acoustic signal transmitter 542 and the acoustic field receiver 544 along the surface of the structure 570. The distance in this example between the acoustic field receiver 544 and a top surface of the structure 570, as well as between the acoustic signal transmitter 542 and a bottom surface of the structure 570, is approximately 1 inch. In other cases, the distance between the structure and the acoustic signal transmitter 542 and/or the acoustic field receiver 544 can be within two signal lengths. In this example, there is a crack 574 along a weld 573 in the body 572 in the structure 570.

In this example, the acoustic signal transmitter 542 nominally emits acoustic signals at a frequency of 100 kHz. Also, the acoustic field receiver 544 receives resulting acoustic fields having a range of frequencies between 100 kHz and 1.2 MHz, which means that the acoustic field receiver 544 can measure up to 11 harmonic frequencies of the base acoustic signal emitted by the acoustic signal transmitter 542. The acoustic field receiver 544 in this case includes a hydrophone that is amplified by a pre-amplifier that operates in a frequency range of 500 Hz to 2 MHz. As the vehicle 502 moves the acoustic signal transmitter 542 and the acoustic field receiver 544 along the surface of the structure 570, acoustic data is acquired at 121 positions along the weld 573 in increments of 0.2 mm.

Figure 6:
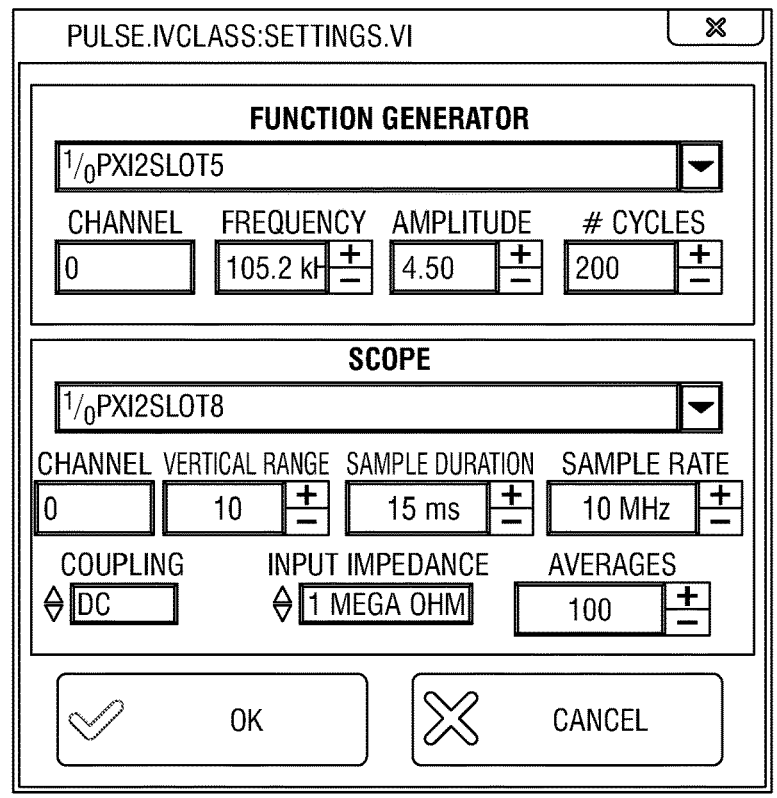
FIG. 6 shows a graphical user interface for a controller in accordance with certain example embodiments.

FIG. 6 shows a graphical user interface 699 for a controller (e.g., controller 104) in accordance with certain example embodiments. Referring to FIGS. 1 through 6, the graphical user interface 699 includes a number of settings for an acoustic field receiver (e.g., acoustic field receiver 544) and an acoustic signal transmitter (e.g., acoustic signal transmitter 542). For example, based on the selections in the graphical user interface 699, the acoustic signal transmitter emits acoustic signals at 105.2 kHz (where maximum amplitude is achieved). The acoustic signals are at 200 cycles of a sinusoid with (pre-amplified) amplitude of 4.5V. As another example, based on the selections in the graphical user interface 699, the acoustic field receiver acquires resulting acoustic fields for 15 ms, with a sampling rate of 10 MHz. Also, for each measurement point, the signal emission/acquisition is averaged 100 times.

Figure 7A:
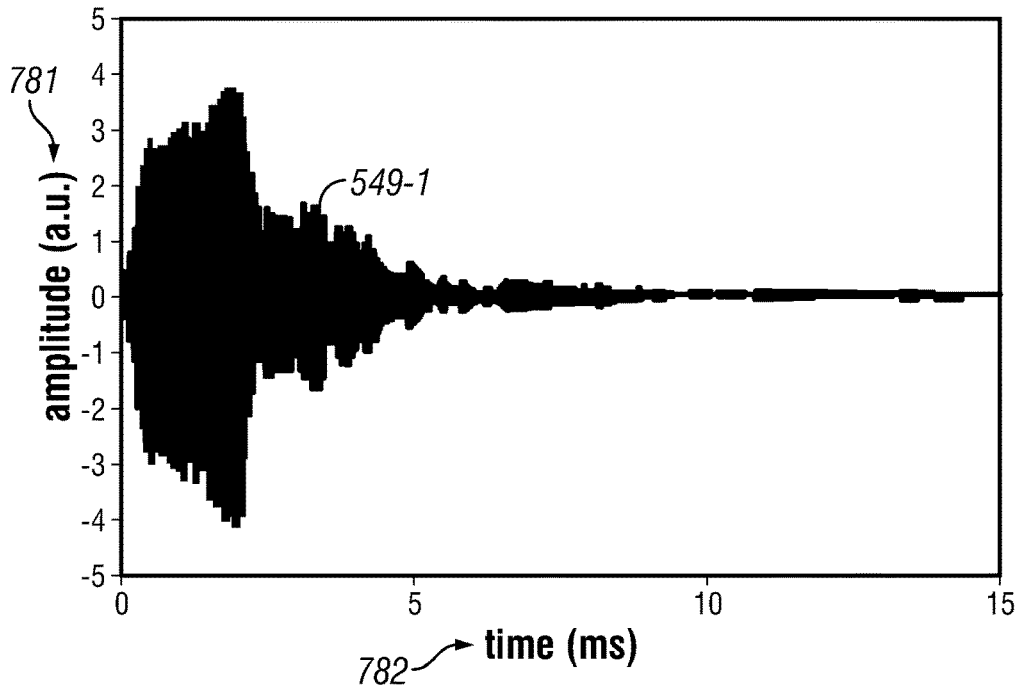
FIGS. 7A through 7C show graphs of readings received by the acoustic field receiver of FIG. 5.
Figure 7B:
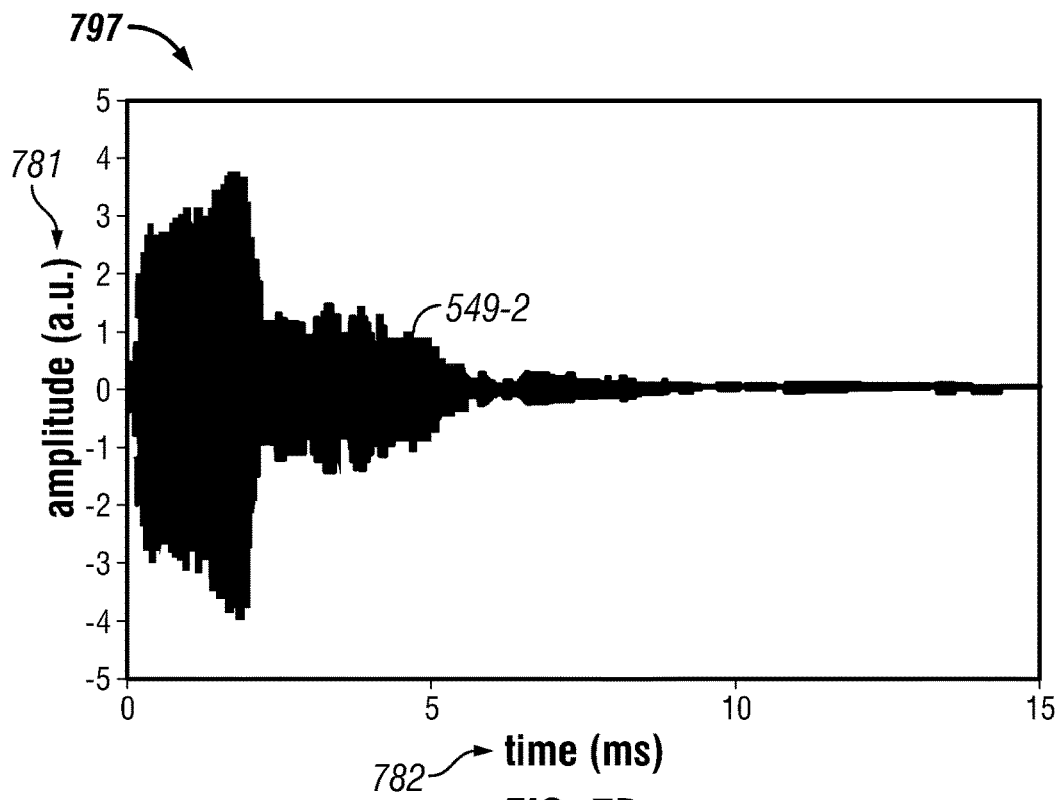
Figure 7C:
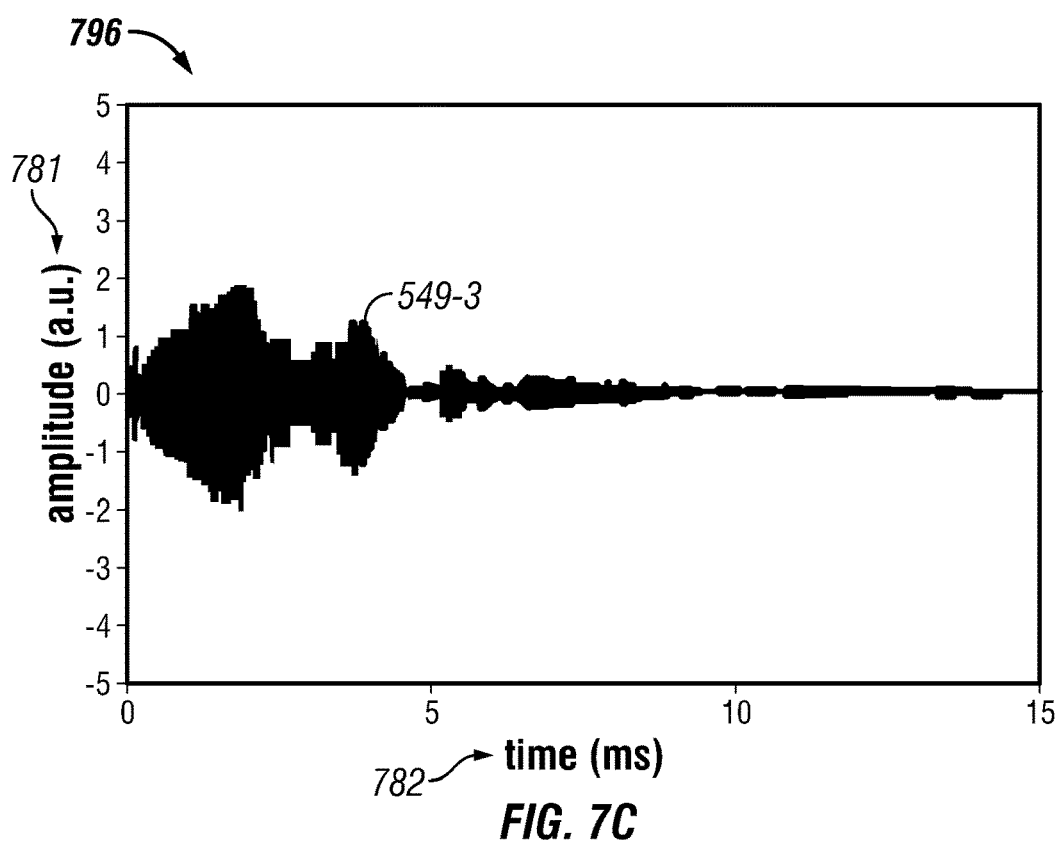

FIGS. 7A through 7C show graphs of readings received by the acoustic field receiver 544 of FIG. 5. Specifically, FIG. 7A shows a graph 798 of a resulting acoustic field 749-1 where the acoustic field receiver 544 is directly above the crack 574. FIG. 7B shows a graph 797 of a resulting acoustic field 749-2 where the acoustic field receiver 544 is approximately 2 mm away from the crack 574. FIG. 7C shows a graph 796 of a resulting acoustic field 749-3 where the acoustic field receiver 544 is approximately 10 mm away from the crack 574. Each resulting acoustic field 749 is plotted in terms of amplitude 781 along the vertical axis versus time 782 along the horizontal axis.

Figure 8:
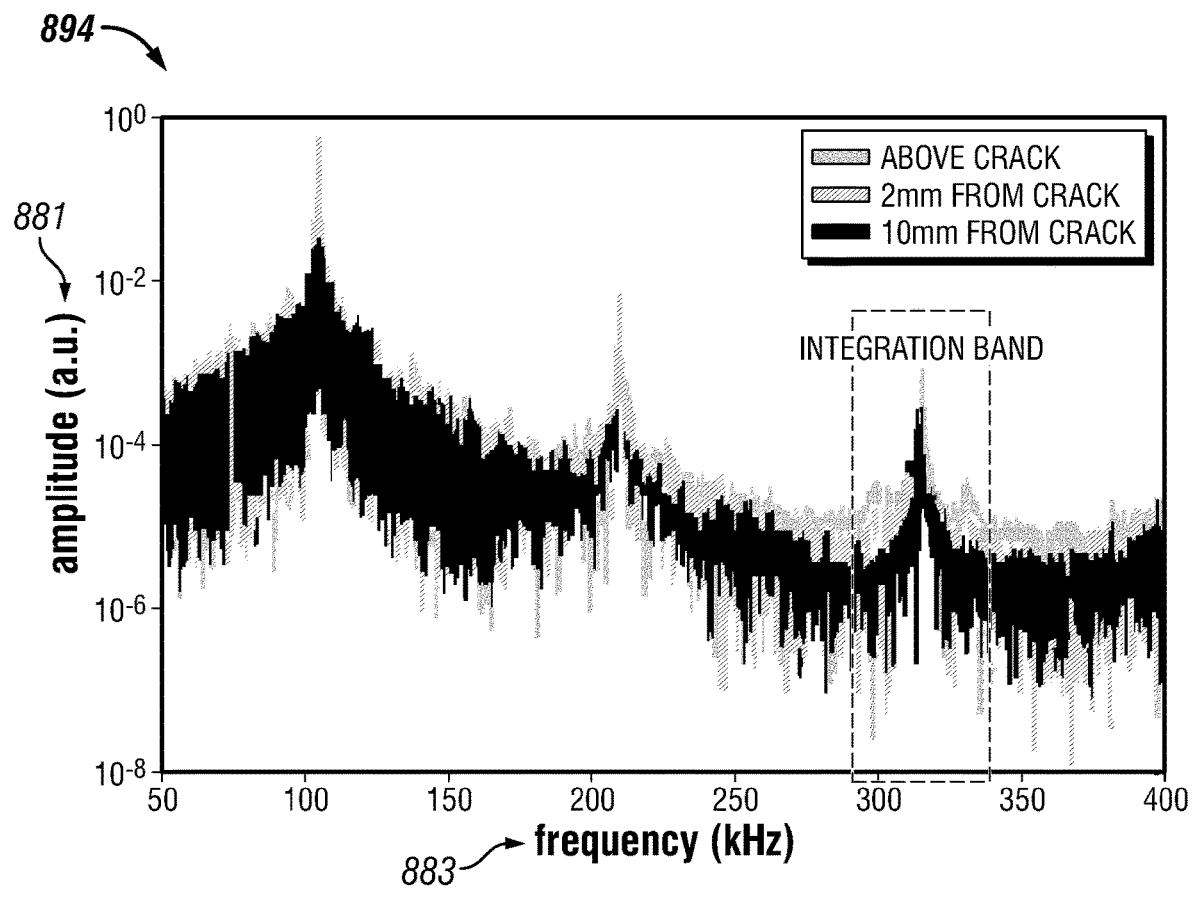
FIG. 8 shows a graph of the readings of FIGS. 7A through 7C integrated with each other for analysis.

FIG. 8 shows a graph 894 of the readings of FIGS. 7A through 7C integrated with each other for analysis. The plots of the graphs of FIGS. 7A through 7C, taken individually, do not provide meaningful information in terms of identifying a crack 574. However, when the measurements taken from various locations along the structure 570 are integrated, as in FIG. 8, the existence of crack 574 can be discerned.

The graph 894 of FIG. 8 plots the measurements of FIGS. 7A through 7C with amplitude 881 along the vertical axis and frequency 883 along the horizontal axis. In this case, the graphs 894 shows a common spike at the base frequency of 105 kHz, as well as less prominent spikes at the second harmonic frequency (approximately 210 kHz) and the third harmonic frequency (approximately 315 kHz). In fact, what occurs in this example is that quantification is performed by integrating the harmonic frequency content of the three measurements within a band centered around the third harmonic frequency. This approach quantifies the harmonic content as a function of scan position of the vehicle 502 (or, more specifically, the acoustic signal transmitter 542 and the acoustic field receiver 544) relative to the structure 570.

Figure 9:
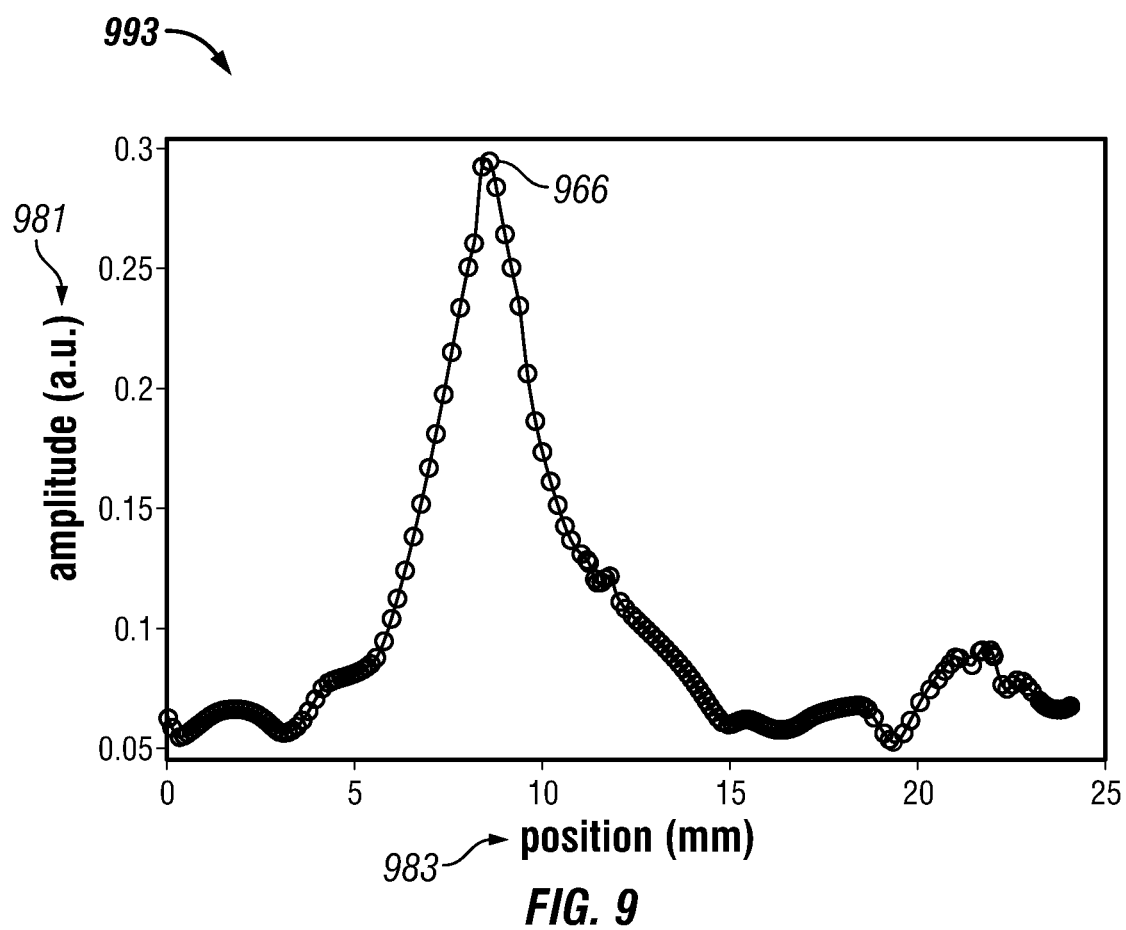
FIG. 9 shows another graph of the readings of FIGS. 7A through 7C integrated with each other for analysis.

FIG. 9 shows another graph 993 of the readings of FIGS. 7A through 7C integrated with each other for analysis. In this case, the graph 993 of FIG. 9 shows a plot of the amplitude 981 of the band centered around the third harmonic frequency (in this case, 315 kHz) at each of the 121 data points measured along the structure 570. The plot of the graph 993 shows the amplitude 981 along the vertical axis and position 983 (in mm) along the structure 570 on the horizontal axis. The width (from about 5 mm to about 14 mm) of the peak 966 indicates the presence of the crack 574, and the location of the peak 966 (about 9 mm) indicates the location of the crack 574 along the structure 570.

Figure 10:
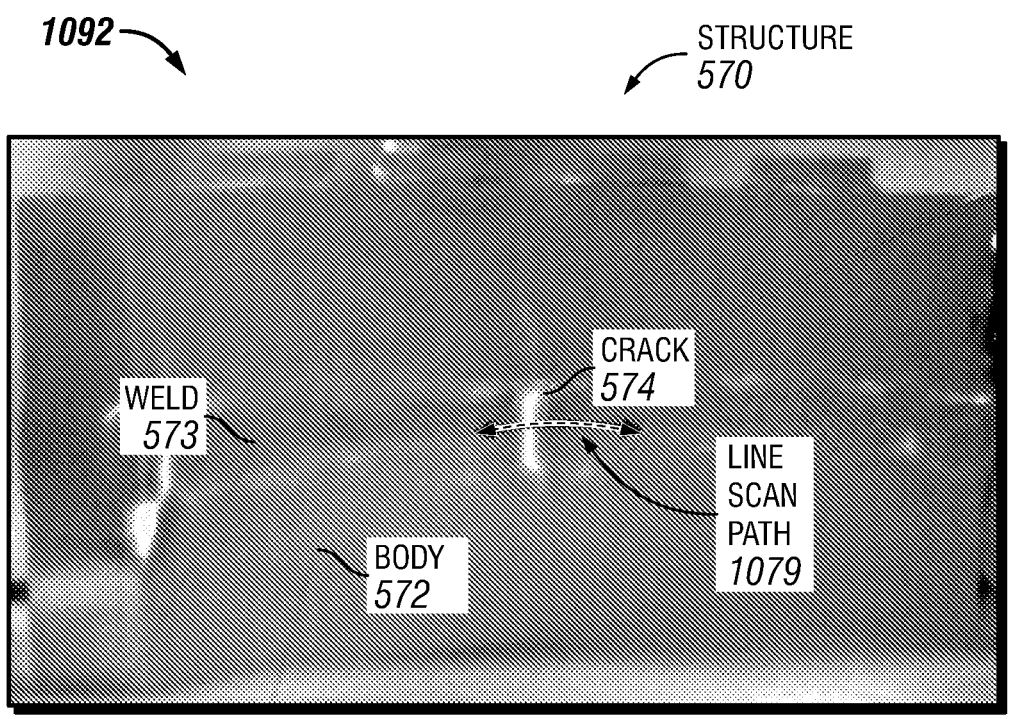
FIG. 10 shows a vibrothermographic scan of the structure of FIG. 5.
Figure 11:
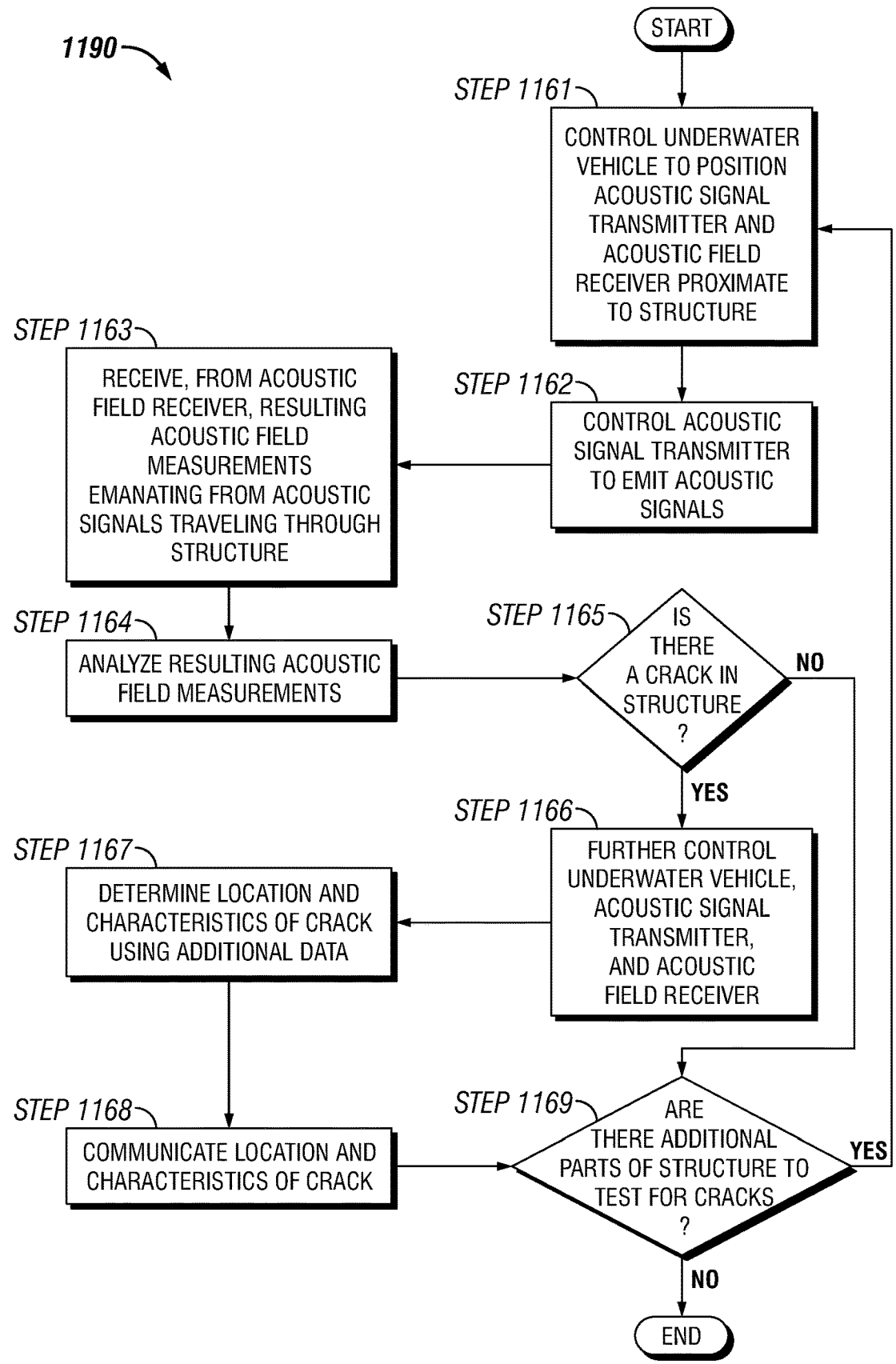
FIG. 11 shows a flowchart of a method for detecting surface cracks using acoustic signals in accordance with certain example embodiments.
Figure 12:
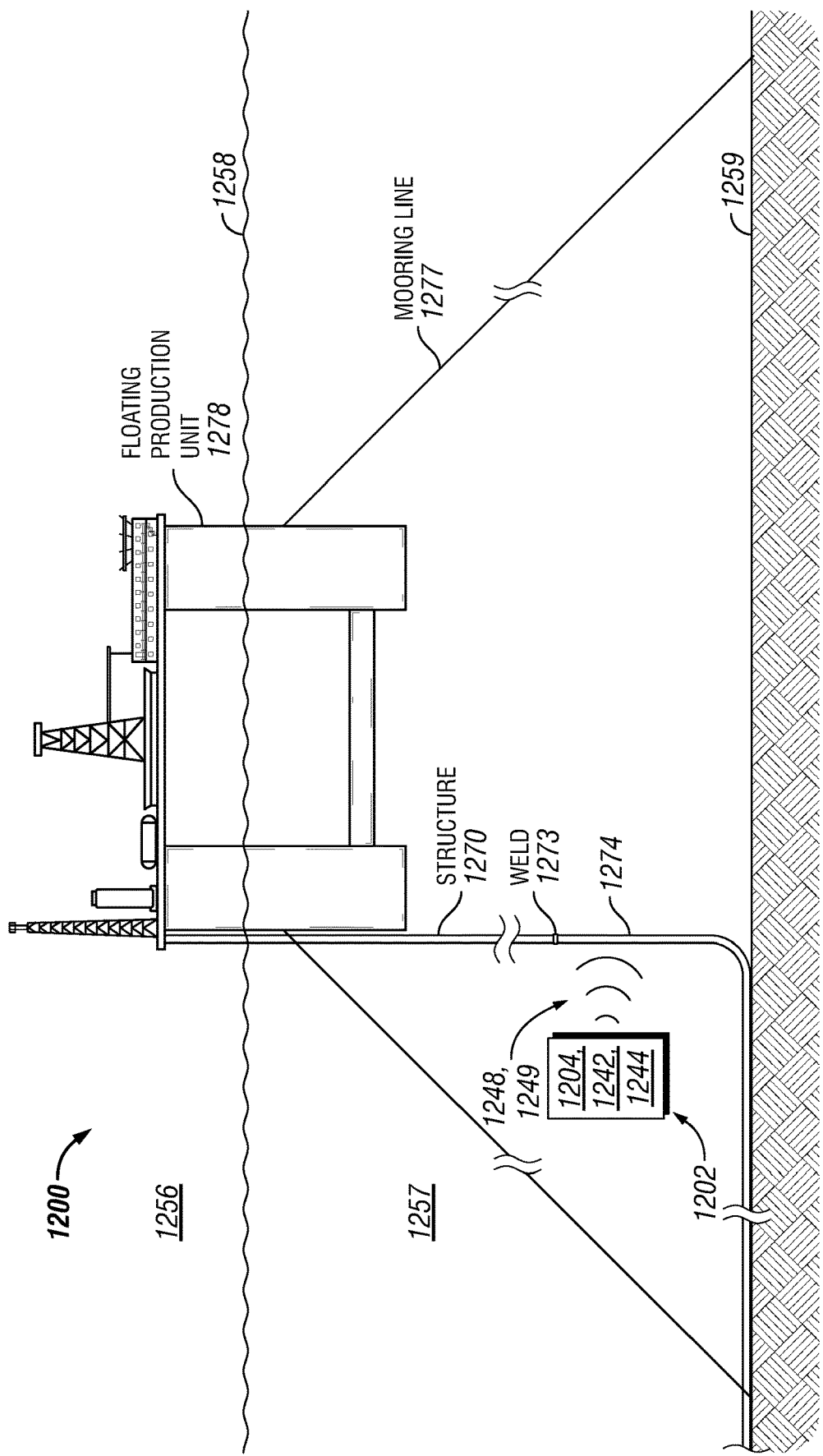
FIGS. 12 through 17 show different systems in which example embodiments can be used.

FIG. 10 shows a vibrothermographic scan 1092 of the structure 570 of FIG. 5. Vibrothermography is a method known in the art that can be used to identify cracks 574 in the structure 570, but vibrothermography cannot be used underwater, The scan 1092 of FIG. 10 shows the line scan path 1079 (in other words, the path along which the vehicle 502 traveled to take the 121 test points) and the confirms the crack 1074 in the weld FIG. 11 shows a flowchart of a method 1190 for detecting surface cracks using acoustic signals in accordance with certain example embodiments. While the various steps in this flowchart are presented and described sequentially, one of ordinary skill in the art will appreciate that some or all of the steps can be executed in different orders, combined or omitted, and some or all of the steps can be executed in parallel depending upon the example embodiment. Further, in one or more of the example embodiments, one or more of the steps described below can be omitted, repeated, and/or performed in a different order. For example, the process of detecting surface cracks using acoustic signals can be a continuous process, and so the START and END steps shown in FIG. 11 can merely denote the start and end of a particular series of steps within a continuous process.

In addition, a person of ordinary skill in the art will appreciate that additional steps not shown in FIG. 11 can be included in performing the method 1190 in certain example embodiments. Accordingly, the specific arrangement of steps should not be construed as limiting the scope. In addition, a particular computing device (such as what is shown in FIG. 3 above) can be used to perform some or all of one or more of the steps for the method 1190 described below in certain example embodiments.

Referring to FIGS. 1 through 11, the example method 1190 of FIG. 11 begins at the START step and proceeds to step 1161, where the underwater vehicle 102 is controlled to position an acoustic signal transmitter 142 and an acoustic field receiver 144 proximate to a structure 170 (or portion thereof). The control of the vehicle 102 can be facilitated through the controller 104, through the network manager 180, through a local controller that is part of the vehicle components 143, through a user 150 using a user system 155, or by any other suitable means. The positioning of the vehicle 102 relative to the structure 170 can be aided using one or more sensors 160 (e.g., proximity sensors, cameras). The vehicle 102 is positioned in such a way that the vehicle 102, the acoustic signal transmitter 142, and the acoustic field receiver 144 are located proximate to, but without physically contacting, the structure 170.

In step 1162, the acoustic signal transmitter 142 is controlled to emit acoustic signals 448. The acoustic signal transmitter 142 can be controlled by the controller 104, the network manager 180, and/or a user system 155. The acoustic signal transmitter 142 can be controlled in terms of power (e.g., on, off), position (e.g., rotation, tilt) of the acoustic signal transmitter 142 relative to the vehicle 102, and characteristics (e.g., frequency, amplitude, duration, direction) of the acoustic signals 448.

In step 1163, the measurements of the resulting acoustic fields 449 emanating from acoustic signals 448 traveling through the structure 170 are received from the acoustic field receiver 144. The measurements of the resulting acoustic fields 449 are received from the acoustic field receiver 144 by the controller 104. In order to measure the resulting acoustic fields 449, the acoustic field receiver 144 can be controlled in terms of power (e.g., on, off), position (e.g., rotation, tilt) of the acoustic field receiver 144 relative to the vehicle 102, and receiving characteristics (e.g., duration, direction) of the acoustic field receiver 144. These aspects of the acoustic field receiver 144 can be controlled by the controller 104, the network manager 180, and/or a user system 155.

In step 1164, the measurements of the resulting acoustic fields 449 are analyzed. The measurements of the resulting acoustic fields 449 can be analyzed by the controller 104 and/or the network manager 180. The analysis of the measurements of the resulting acoustic fields 449 can be done using one or more algorithms 233 and/or one or more protocols 232. The analysis can be for measurements of a single location or multiple locations along the structure 170. The analysis can be of one harmonic frequency, multiple harmonic frequencies, and/or one or more other frequencies inbetween with respect to the measurements of the resulting acoustic fields 449. The analysis can be based on the use of historical data (e.g., historical data with respect to the structure 170, historical data with respect to other structures, historical data with respect to the acoustic field receiver 144, historical data with respect to the acoustic signal transmitter 142).

In step 1165, a determination is made as to whether there is a crack 174 in the structure 170. The determination can be made by the controller 104 and/or the network manager 180 based on the analysis performed in step 1164. The determination can be made using one or more algorithms 233 and/or one or more protocols 232. If it is determined that there is a crack 174 in the structure, then the process proceeds to step 1166. If it is determined that there is no crack 174 in the structure, then the process proceeds to step 1169.

In step 1166, the underwater vehicle 102, the acoustic signal transmitter 142, and/or the acoustic field receiver 144 are further controlled. This further control can be facilitated through the controller 104, through the network manager 180, through a local controller that is part of the vehicle components 143, through a user 150 using a user system 155, and/or by any other suitable means. The further control is enabled in order to capture additional data associated with the crack 174 in the structure 170.

This step 1166 can include some or all of the processes involved in steps 1161, 1162. 1163, and 1164 above. In addition, some or all of the processes involved in steps 1161, 1162. 1163, and 1164 can be repeated multiple times in this step 1166. For example, as discussed above with respect to FIGS. 5 through 9, part of the control can include having 121 data collection points that are approximately 2 mm apart from each other. The measurements taken by the acoustic field receiver 144 as a result of the additional control and testing in this step 1166 accumulate as additional data.

In step 1167, the location and characteristics of the crack 174 are determined using the additional data collected in step 1166. The characteristics of the crack 174 can include, but are not limited to, the length of the crack, the width of the crack 174 along its length, the depth of the crack 174 along its length, and the uniformity of the crack along its length. The location of the crack 174 can include, for example, the precise location and orientation of the crack 174 on the structure 170. The location and characteristics of the crack 174 can be determined by the controller 104 and/or the network manager 180 using one or more protocols 232 and/or one or more algorithms 233.

In step 1168, the location and characteristics of the crack 174 are communicated. The communication can be made by the controller 104 and/or the network manager 180 to one or more users 150 (including associated user systems 155). Alternatively, the communication can be made by the controller 104 to the network manager 180. The communication can take any of a number of forms (e.g., an email, a series of SMS messages, an audio file, activation of an indicating light) and can be sent using the communication links 105.

In step 1169, a determination is made as to whether there are additional parts of the structure 170 to test for cracks 174. The determination can be made by the controller 104, the network manager 180, and/or a user 150 (including an associated user system 155). If there are additional parts of the structure 170 to test for cracks 174, then the process reverts to step 1161. If there are no additional parts of the structure 170 to test for cracks 174, then the process ends at the END step.

FIGS. 12 through 17 show different systems in which example embodiments can be used. Referring to FIGS. 1 through 17, the various components and terms used in FIGS. 12 through 17 are substantially the same as the corresponding components described above with respect to FIGS. 1 through 9. The system 1200 of FIG. 12 includes a structure 1270 in the form of a steel catenary riser (SCR) that is disposed mostly underwater 1257 and has a number of welds 1273 along its length. The portion of the SCR that is in the above-water environment 1256 is integrated with a floating production unit 1278 that sits above the waterline 1258. The base of the floating production unit 1278 is disposed underwater 1257 and is stabilized by mooring lines 1277 that are anchored into the seabed 1259. The system 1200 of FIG. 12 also includes a vehicle 1202 located underwater 1257. The vehicle 1202 includes a controller 1204, at least one acoustic signal transmitter 1242, and at least one acoustic field receiver 1244.

Each acoustic signal transmitter 1242 emits one or more acoustic signals 1248, which travel through the structure 1270 and any cracks 1274 in the structure 1270. The resulting acoustic fields that emanate from the structure 1270 are captured and measured by the acoustic field receiver 1244. The controller 1204 and/or the network manager (e.g., network manager 180) can analyze these measurements and identify whether any cracks 1274 in the structure 1270 exist. In such a case, the controller 1204 can control the vehicle 1202, including components thereof, to collect and analyze additional data to locate and define the cracks 1274 in the structure 1270.

Figure 13:
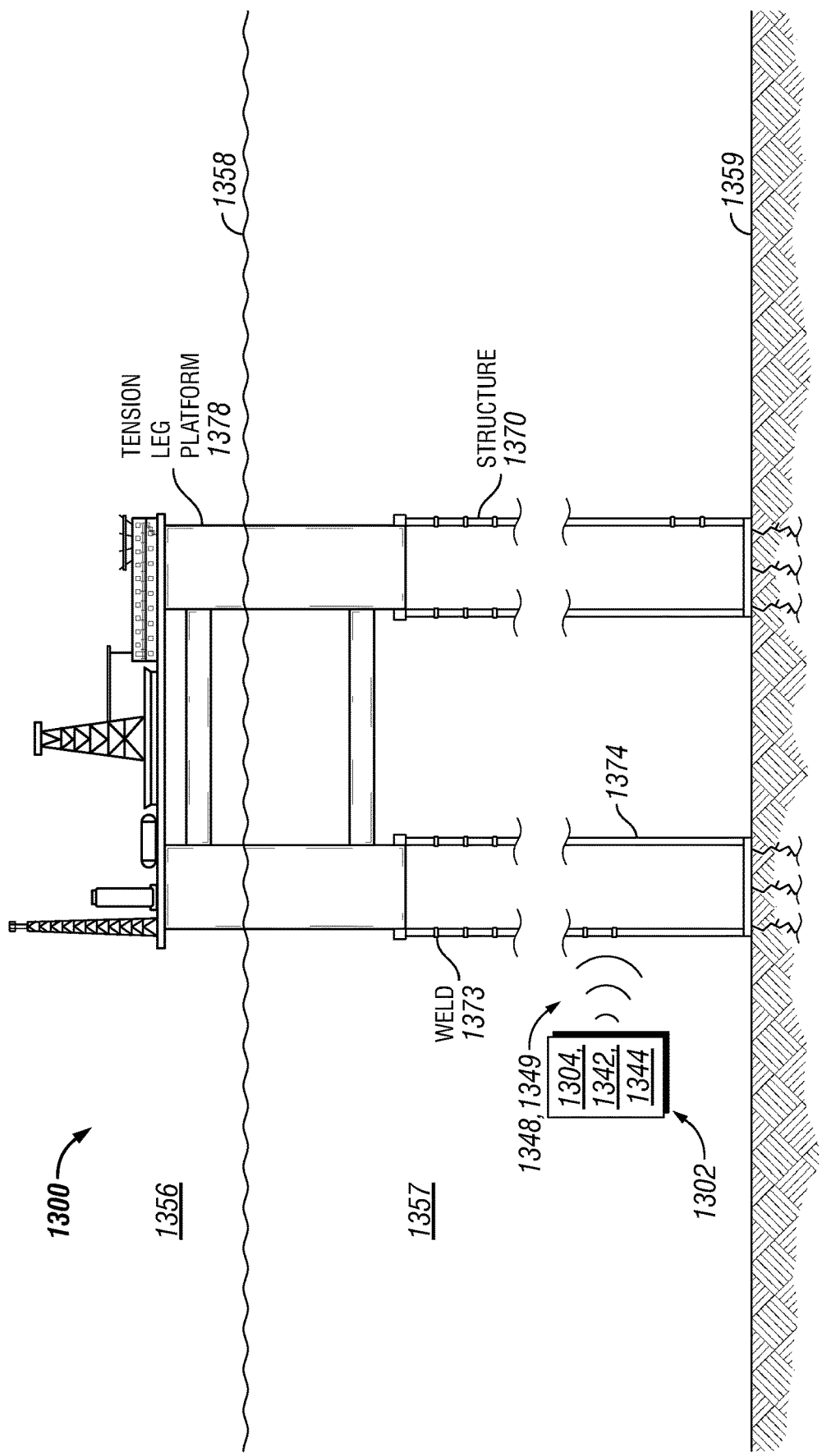

The system 1300 of FIG. 13 includes a structure 1370 in the form of a number tension leg platform (TLP) tendons that support a TLP. The TLP tendons are disposed underwater 1357 and has a number of welds 1373 along their length. The distal end of the TPS tendons are embedded in the seabed 1359. The TLP 1378 sits above the waterline 1358 in the above-water environment 1356. The base of the TLP 1378 is disposed underwater 1357. The system 1300 of FIG. 13 also includes a vehicle 1302 located underwater 1357. The vehicle 1302 includes a controller 1304, at least one acoustic signal transmitter 1342, and at least one acoustic field receiver 1344.

Each acoustic signal transmitter 1342 emits one or more acoustic signals 1348, which travel through the structure 1370 and any cracks 1374 in the structure 1370. The resulting acoustic fields that emanate from the structure 1370 are captured and measured by the acoustic field receiver 1344. The controller 1304 and/or the network manager (e.g., network manager 180) can analyze these measurements and identify whether any cracks 1374 in the structure 1370 exist. In such a case, the controller 1304 can control the vehicle 1302, including components thereof, to collect and analyze additional data to locate and define the cracks 1374 in the structure 1370.

Figure 14:
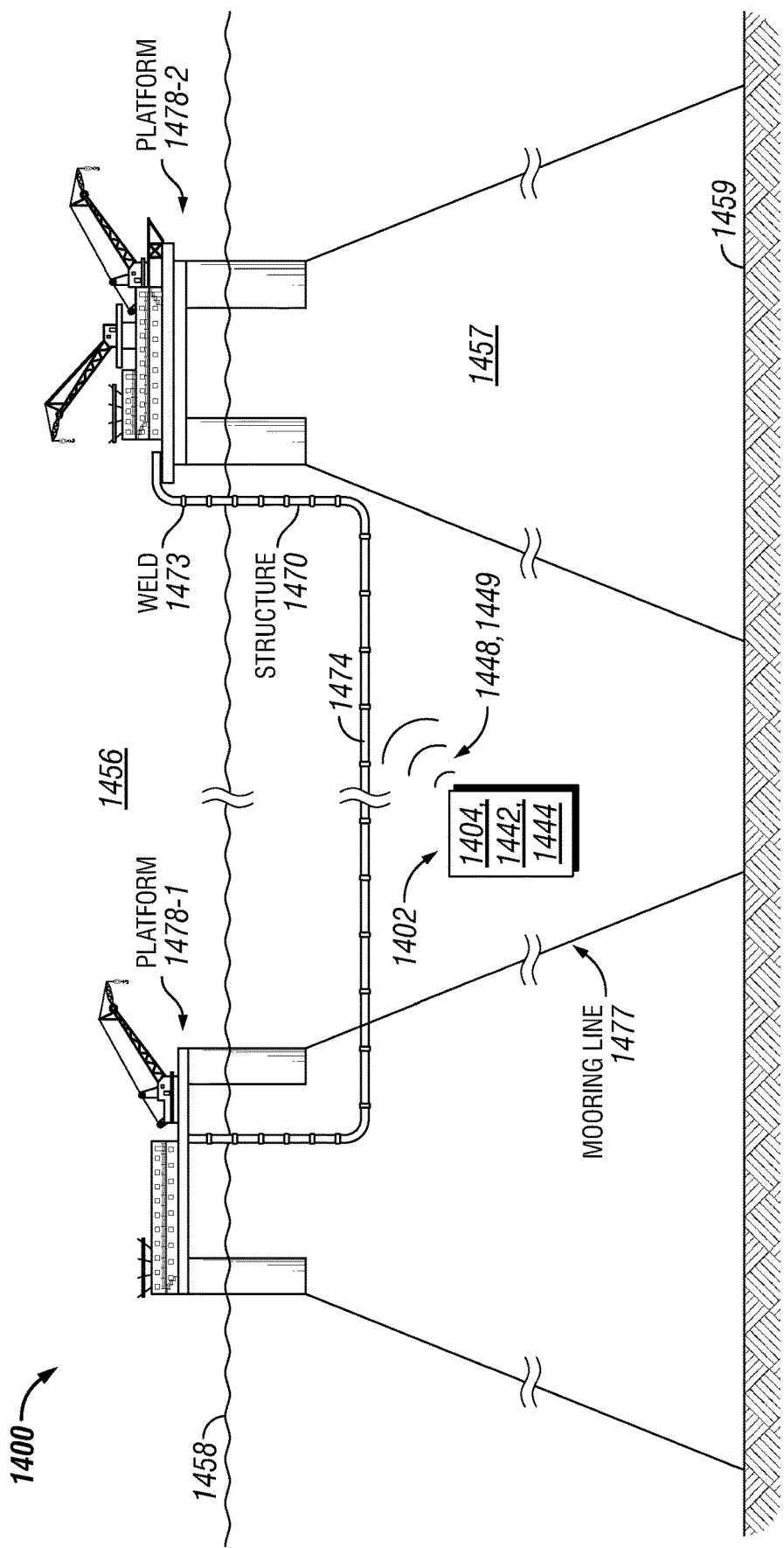

The system 1400 of FIG. 14 includes a structure 1470 in the form of an oil offloading line that is disposed mostly underwater 1457 and has a number of welds 1473 along its length. One end of the structure 1470 is in the above-water environment 1456 and is integrated with a first platform 1478-1 that floats at the waterline 1458. The other end of the structure 1470 is in the above-water environment 156 and is integrated with a second platform 1478-2 that floats at the waterline 1458. Both platforms 1478 are stabilized by mooring lines 1477 that are anchored into the seabed 1459. The system 1400 of FIG. 14 also includes a vehicle 1402 located underwater 1457. The vehicle 1402 includes a controller 1404, at least one acoustic signal transmitter 1442, and at least one acoustic field receiver 1444.

Each acoustic signal transmitter 1442 emits one or more acoustic signals 1448, which travel through the structure 1470 and any cracks 1474 in the structure 1470. The resulting acoustic fields that emanate from the structure 1470 are captured and measured by the acoustic field receiver 1444. The controller 1404 and/or the network manager (e.g., network manager 180) can analyze these measurements and identify whether any cracks 1474 in the structure 1470 exist. In such a case, the controller 1404 can control the vehicle 1402, including components thereof, to collect and analyze additional data to locate and define the cracks 1474 in the structure 1470.

Figure 15:
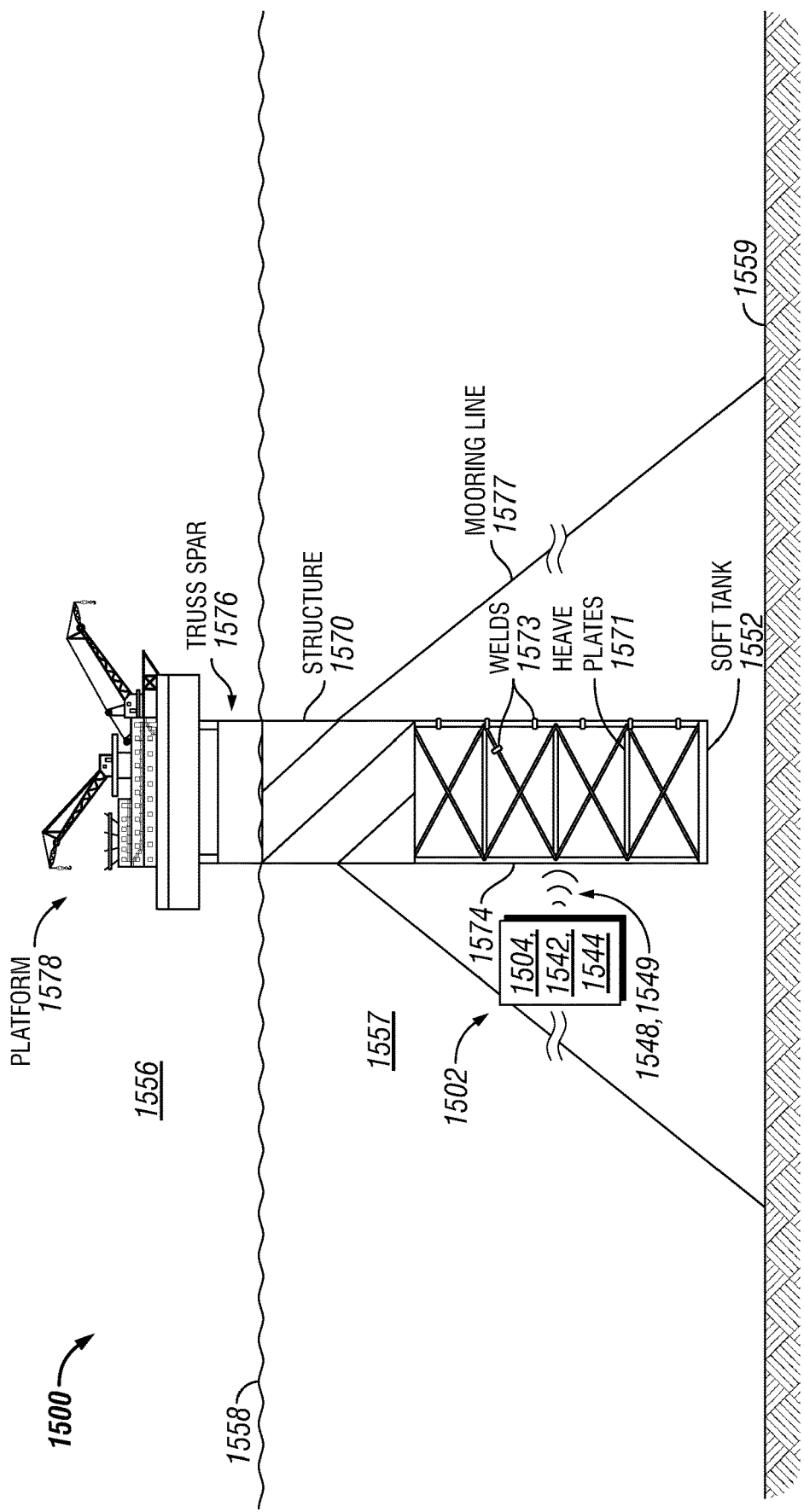

The system 1500 of FIG. 15 includes a structure 1570 in the form of a hull with a truss structure that is disposed underwater 1557 and has a number of welds 1573 and heave plates 1571 throughout the truss structure. A soft tank 1552 is disposed at the distal end of the structure 1570. A truss spar 1576 and a platform 1578 are disposed in the above-water environment 1556 and are supported by the structure 1570. The platform 1578 and at least a portion of the truss spar 1576 sit above the waterline 1558. The structure 1570 is stabilized by mooring lines 1577 that are anchored into the seabed 1559. The system 1500 of FIG. 15 also includes a vehicle 1502 located underwater 1557. The vehicle 1502 includes a controller 1504, at least one acoustic signal transmitter 1542, and at least one acoustic field receiver 1544.

Each acoustic signal transmitter 1542 emits one or more acoustic signals 1548, which travel through the structure 1570 and any cracks 1574 in the structure 1570. The resulting acoustic fields that emanate from the structure 1570 are captured and measured by the acoustic field receiver 1544. The controller 1504 and/or the network manager (e.g., network manager 180) can analyze these measurements and identify whether any cracks 1574 in the structure 1570 exist. In such a case, the controller 1504 can control the vehicle 1502, including components thereof, to collect and analyze additional data to locate and define the cracks 1574 in the structure 1570.

Figure 16:
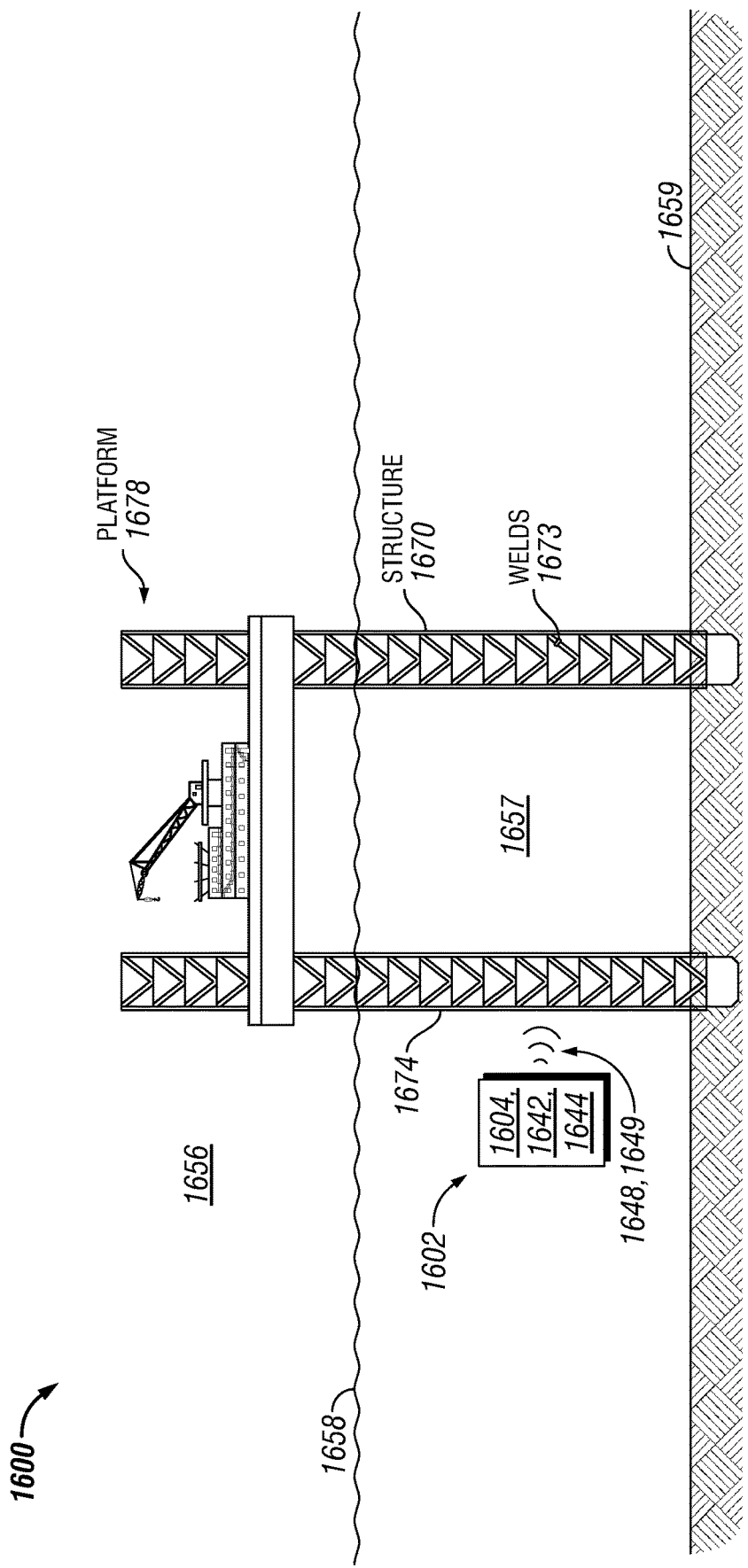

The system 1600 of FIG. 16 includes a structure 1670 in the form of a number of legs that support a platform 1678 (also sometimes called a hull). The legs are disposed, at least in part, underwater 1657 and has a number of welds 1673 along their length. The distal end of the legs are embedded in the seabed 1659. The platform 1678 sits above the waterline 1658 in the above-water environment 1656. The base of the platform 1678 is disposed underwater 1657. The system 1600 of FIG. 16 also includes a vehicle 1602 located underwater 1657. The vehicle 1602 includes a controller 1604, at least one acoustic signal transmitter 1642, and at least one acoustic field receiver 1644.

Each acoustic signal transmitter 1642 emits one or more acoustic signals 1648, which travel through the structure 1670 and any cracks 1674 in the structure 1670. The resulting acoustic fields that emanate from the structure 1670 are captured and measured by the acoustic field receiver 1644. The controller 1604 and/or the network manager (e.g., network manager 180) can analyze these measurements and identify whether any cracks 1674 in the structure 1670 exist. In such a case, the controller 1604 can control the vehicle 1602, including components thereof, to collect and analyze additional data to locate and define the cracks 1674 in the structure 1670.

Figure 17:
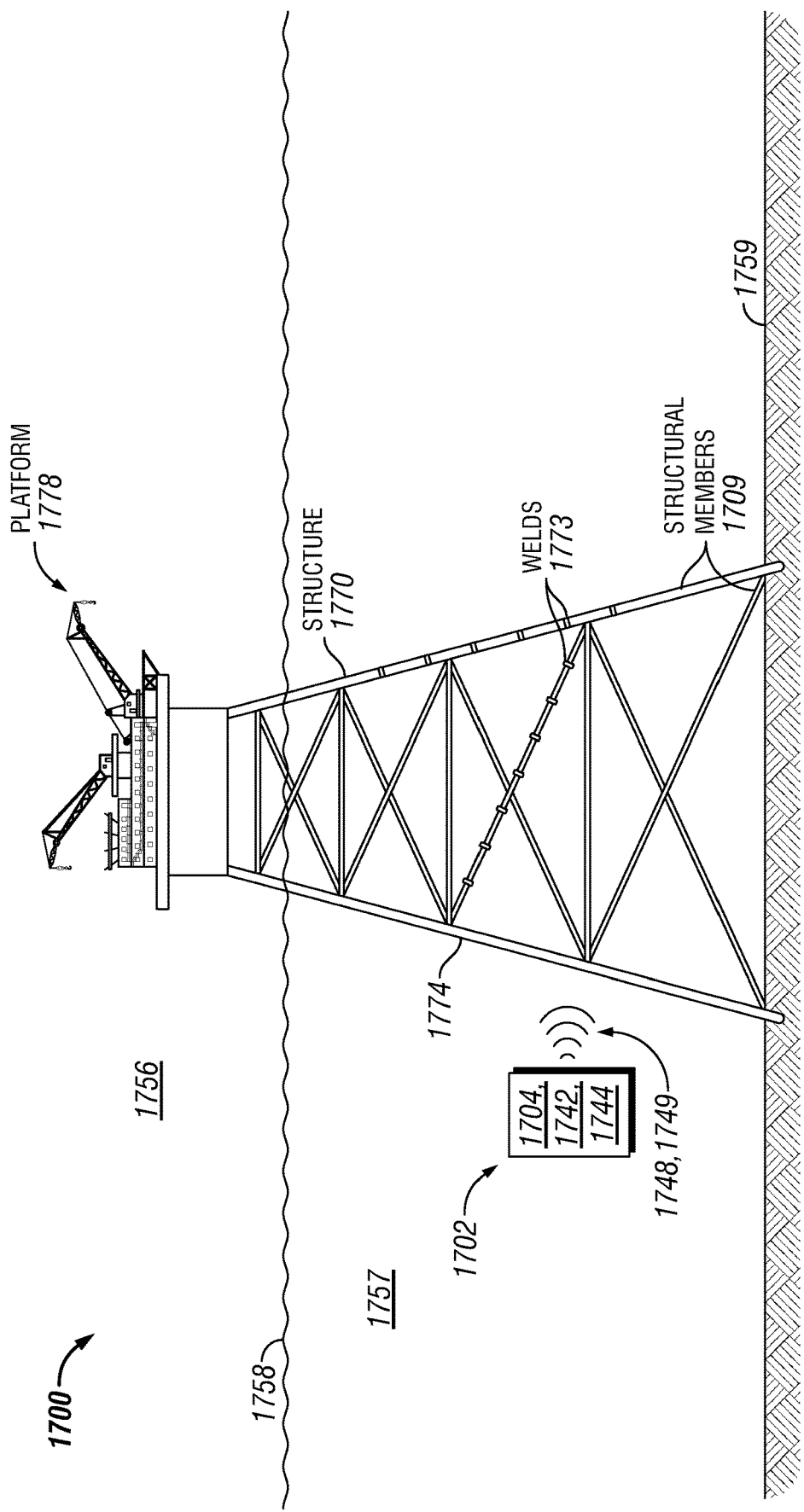

The system 1700 of FIG. 17 includes a structure 1770 in the form of a fixed lattice-type structure that supports a platform 1778. The legs are disposed, at least in part, underwater 1757 and has a number of welds 1773 and structural members 1709 along its length. The distal end of the structure 1770 is embedded in the seabed 1759. The platform 1778 sits above the waterline 1758 in the above-water environment 1756. The base of the platform 1778 is disposed underwater 1757. The system 1700 of FIG. 17 also includes a vehicle 1702 located underwater 1757. The vehicle 1702 includes a controller 1704, at least one acoustic signal transmitter 1742, and at least one acoustic field receiver 1744.

Each acoustic signal transmitter 1742 emits one or more acoustic signals 1748, which travel through the structure 1770 and any cracks 1774 in the structure 1770. The resulting acoustic fields that emanate from the structure 1770 are captured and measured by the acoustic field receiver 1744. The controller 1704 and/or the network manager (e.g., network manager 180) can analyze these measurements and identify whether any cracks 1774 in the structure 1770 exist. In such a case, the controller 1704 can control the vehicle 1702, including components thereof, to collect and analyze additional data to locate and define the cracks 1774 in the structure 1770.

Figure 18:
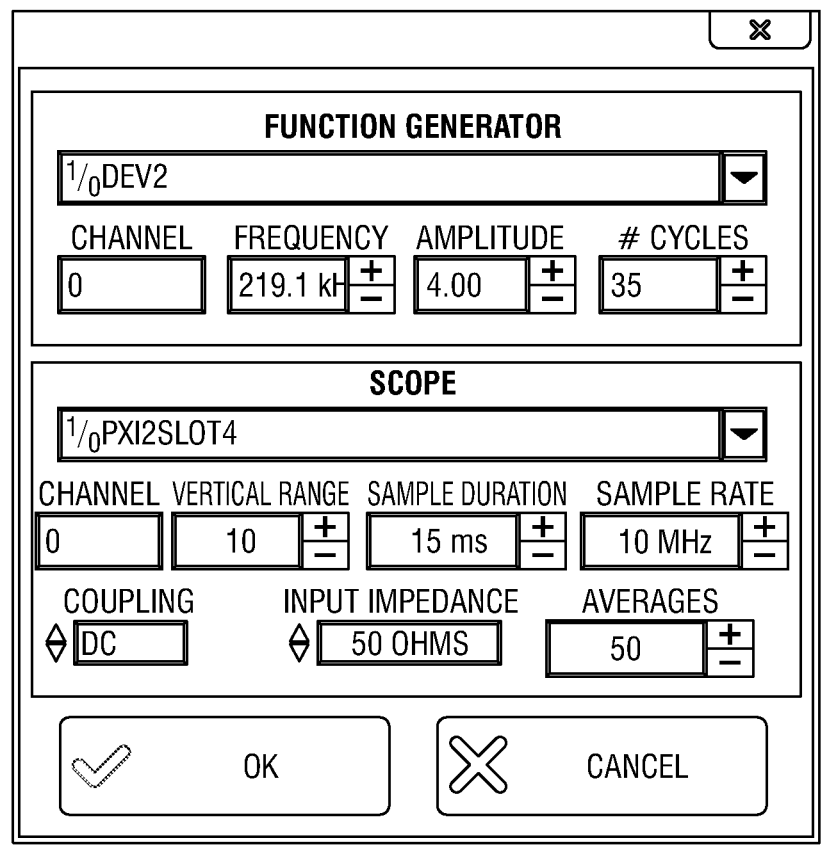
FIG. 18 shows another graphical user interface for a controller in accordance with certain example embodiments.

FIG. 18 shows another graphical user interface for a controller in accordance with certain example embodiments. Referring to FIGS. 1 through 18, the graphical user interface 1899 includes a number of settings for an acoustic field receiver (e.g., acoustic field receiver 544) and an acoustic signal transmitter (e.g., acoustic signal transmitter 542). The hardware in this case can include an amplifier (e.g., having a highpass cutoff of 1 Hz, a lowpass cutoff of 1 MHz, and a maximum gain of 40 dB). The acoustic source transmitter can have a normal frequency of operation of 200 kHz and an active diameter of 13 mm. The acoustic field receiver can have an operational frequency range between 100 kHz and 1.2 MHz.

Based on the selections in the graphical user interface 699, the acoustic signal transmitter emits acoustic signals at 219.1 kHz (where maximum amplitude is achieved). The source acoustic signals are a 4.0 V amplified signal of 35 sinusoid cycles. As another example, based on the selections in the graphical user interface 699, the acoustic field receiver samples the resulting acoustic fields for 15 ms at a sampling rate of 10 MHz. Also, for each measurement point, the signal emission/acquisition is averaged 50 times. The moving stage is configured to sample a total length of 2 cm.

FIGS. 19A through 21B show graphs of readings received by an acoustic field receiver under the settings shown in FIG. 18 in accordance with certain example embodiments. Specifically, referring to FIGS. 1 through 21B, FIG. 19A shows a graph 1998 a resulting acoustic field 1949 where the acoustic field receiver (e.g., acoustic field receiver 544) is 10 mm away from a crack (e.g., crack 574) in a structure (e.g., structure 570). The resulting acoustic field 1949 is plotted in terms of amplitude 1981 along the vertical axis versus time 1982 along the horizontal axis. FIG. 19B shows a graph 1994 of the readings centered around the third harmonic frequency (approximately 657.3 kHz), with frequency 1983 along the horizontal axis and amplitude 1981 along the vertical axis. In the graph 1994 of FIG. 19B, there is no real distinction between measurements taken with an integration band (+/−5 kHz of the third harmonic frequency of 657.3 kHz) and the measurements taken outside of the integration band.

Figure 19A:
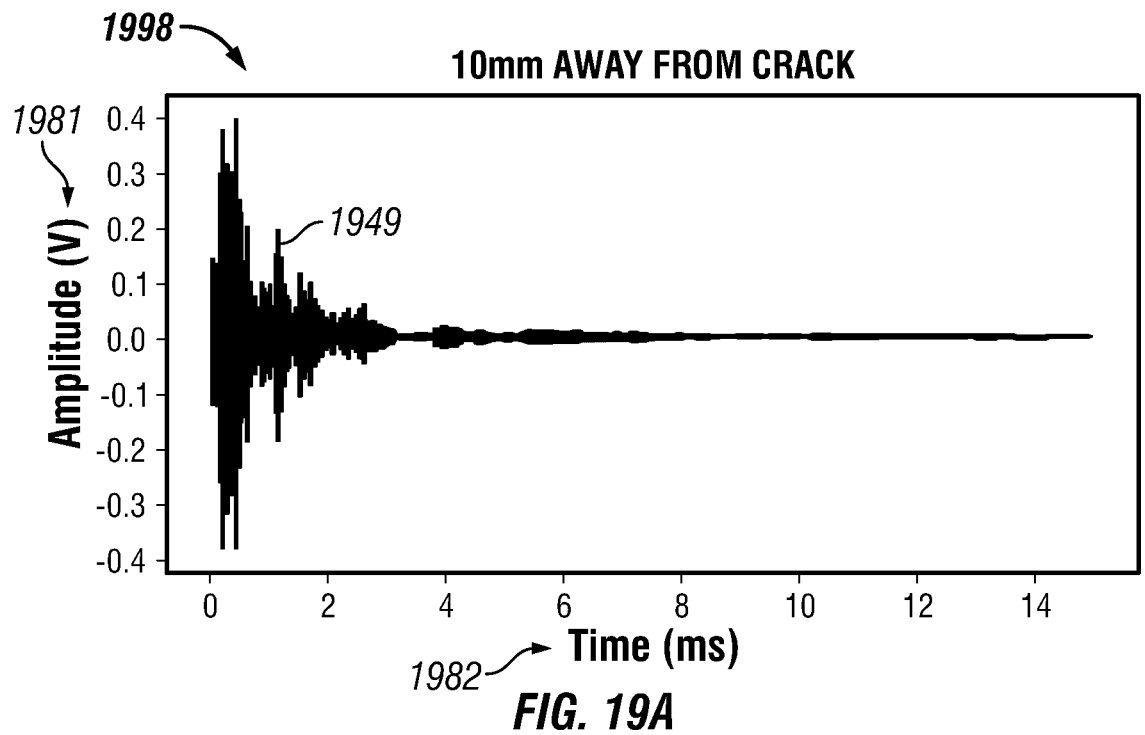
FIGS. 19A through 21B show graphs of readings received by an acoustic field receiver under the settings shown in FIG. 18 in accordance with certain example embodiments.
Figure 19B:
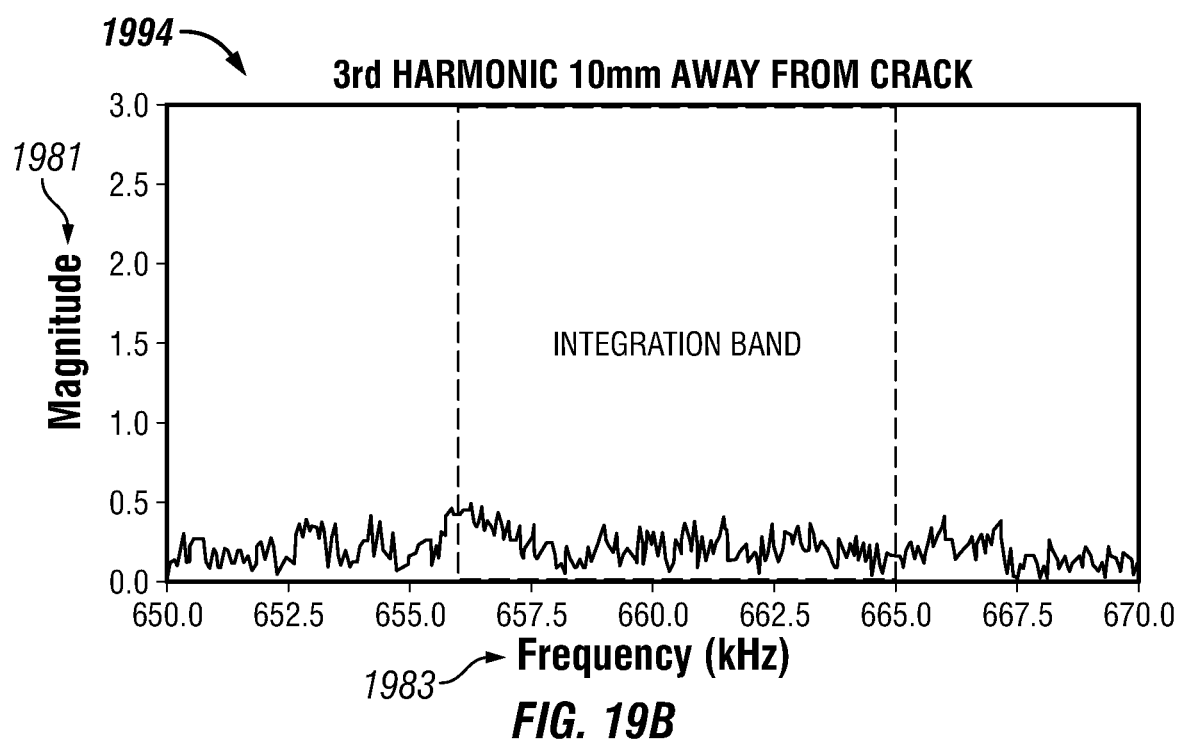
Figure 20A:
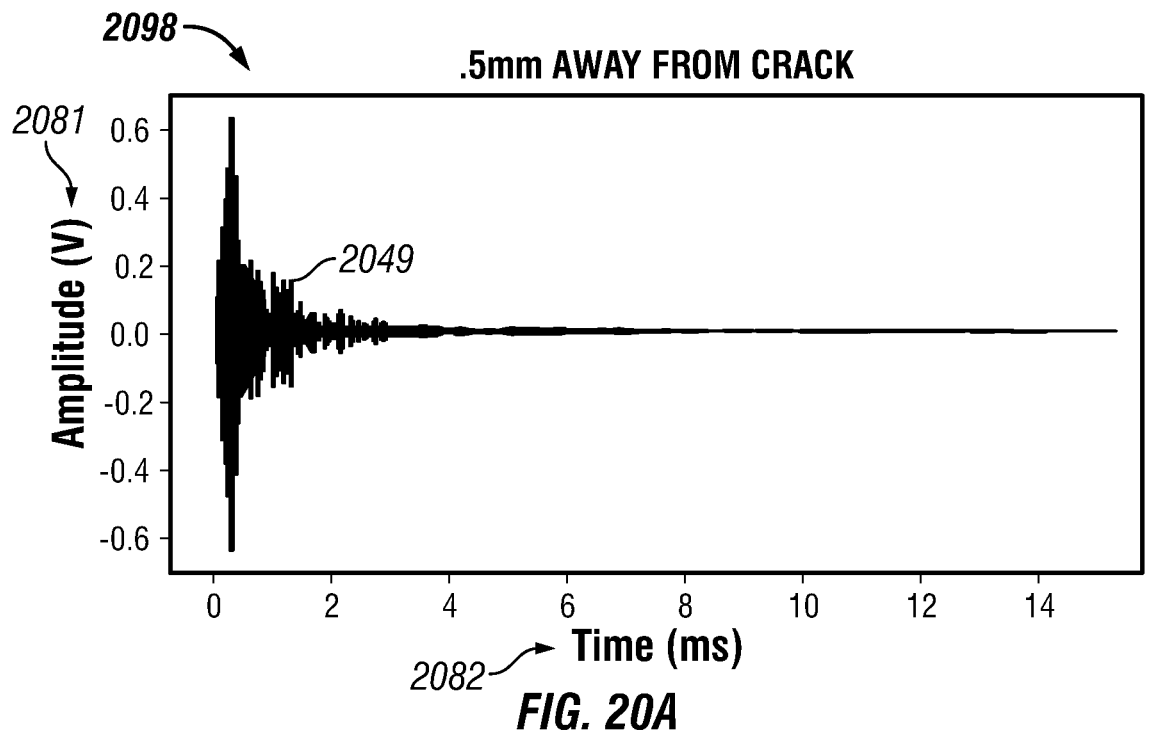
Figure 20B:
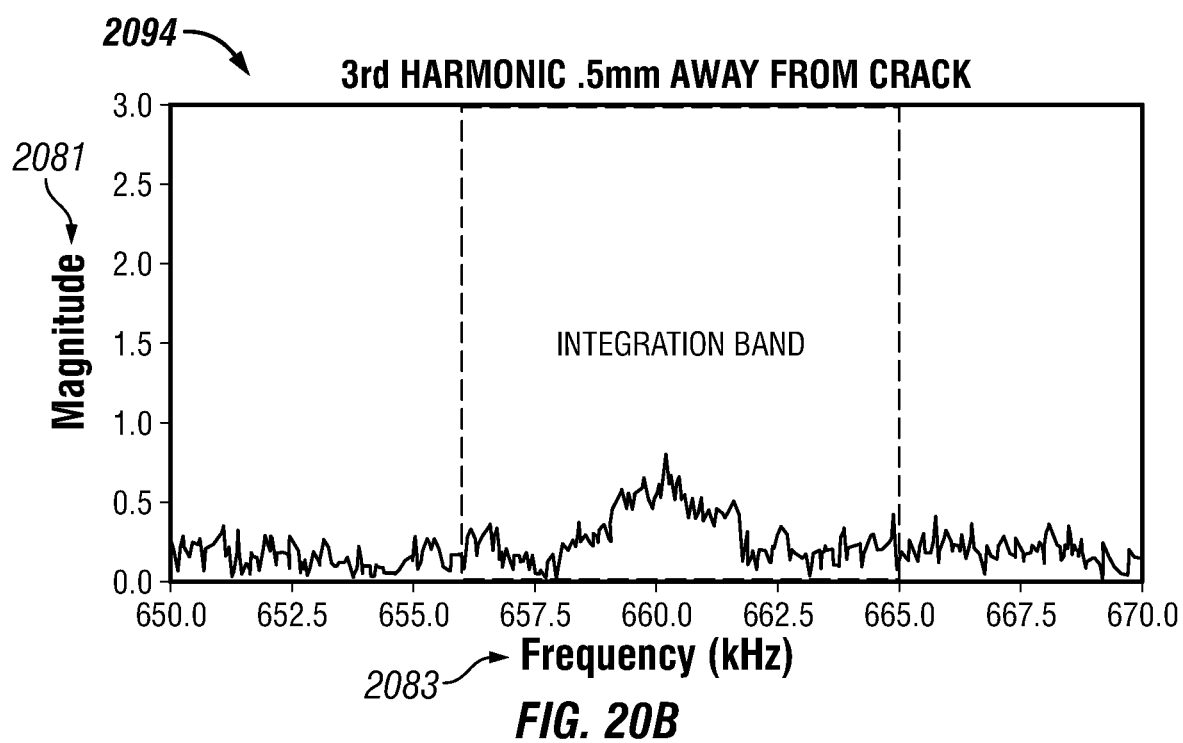

FIG. 20A shows a graph 2098 of a resulting acoustic field 2049 where the acoustic field receiver used in FIGS. 19A and 19B is now located approximately 0.5 mm away from the crack in the structure tested in FIGS. 19A and 19B. The resulting acoustic field 2049 is plotted in terms of amplitude 2081 along the vertical axis versus time 2082 along the horizontal axis. FIG. 20B shows a graph 2094 of the readings centered around the third harmonic frequency (approximately 657.3 kHz), with frequency 2083 along the horizontal axis and amplitude 2081 along the vertical axis. In the graph 2094 of FIG. 20B, there is a noticeable distinction (at least twice the magnitude) between measurements taken with an integration band (+/−5 kHz of the third harmonic frequency of 657.3 kHz) and the measurements taken outside of the integration band.

Figure 21A:
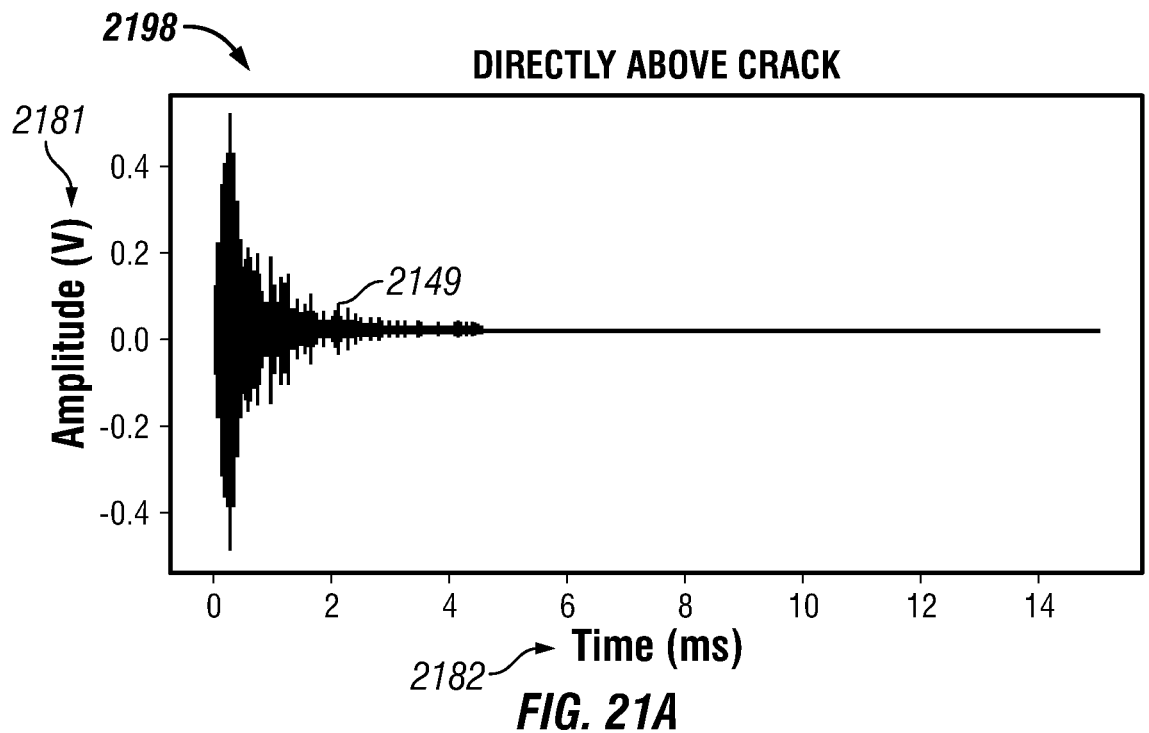
Figure 21B:
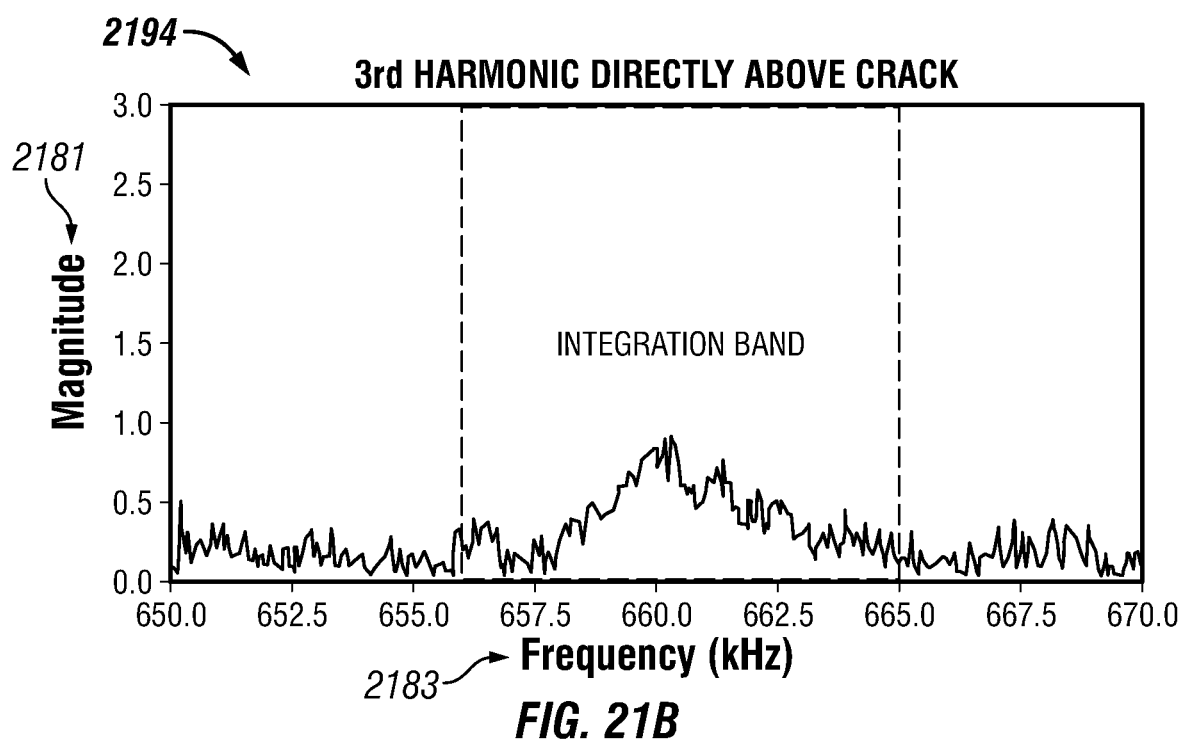

FIG. 21A shows a graph 2198 of a resulting acoustic field 2149 where the acoustic field receiver used in FIGS. 19A through 20B is now located directly over the crack in the structure tested in FIGS. 19A through 20B. The resulting acoustic field 2149 is plotted in terms of amplitude 2181 along the vertical axis versus time 2182 along the horizontal axis. FIG. 21B shows a graph 2194 of the readings centered around the third harmonic frequency (approximately 657.3 kHz), with frequency 2183 along the horizontal axis and amplitude 2181 along the vertical axis. In the graph 2194 of FIG. 21B, there is an even more noticeable distinction (still at least twice the magnitude, but over a broader range of frequencies) between measurements taken with an integration band (+/−5 kHz of the third harmonic frequency of 657.3 kHz) and the measurements taken outside of the integration band.

As was the case in FIGS. 7A through 8 above, evaluating the measurements in the time domain (as in FIGS. 19A, 20A, and 21A), no conclusions can be made with respect to the existence of a crack in the structure. On the other hand, when the measurements taken from various locations along the structure are considered in the frequency domain (as in FIGS. 19B, 20B, and 21), the existence of crack in the structure can be discerned and located. This approach quantifies the harmonic content as a function of scan position of the vehicle (e.g., vehicle 502 or, more specifically, the acoustic signal transmitter 542 and the acoustic field receiver 544) relative to the structure.

Figure 22:
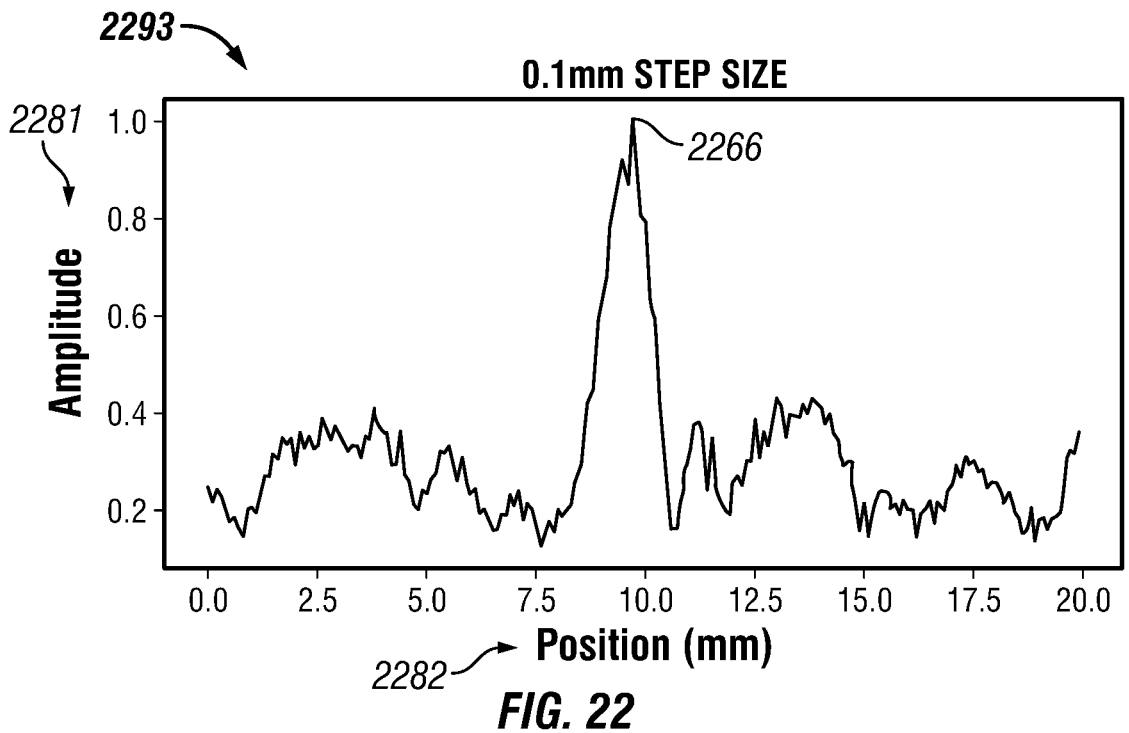
FIGS. 22 and 23 show graphs of the readings of FIGS. 19A through 20B integrated with each other for analysis.
Figure 23:
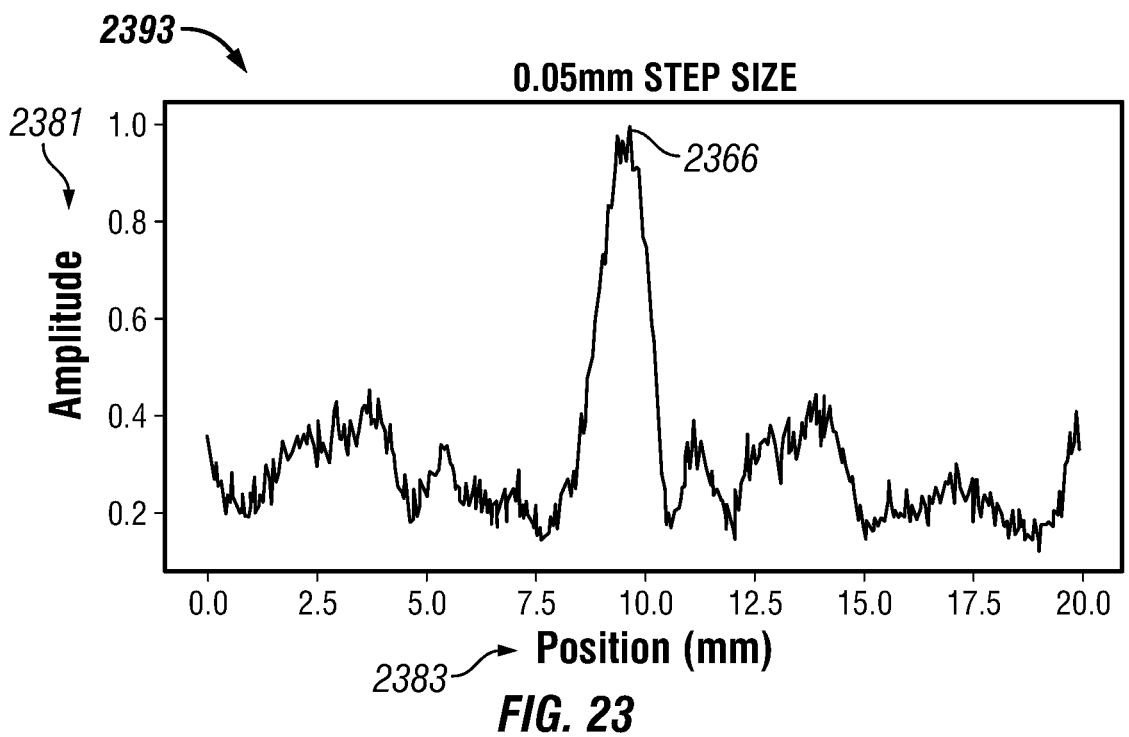

FIGS. 22 and 23 show graphs of the readings of FIGS. 19A through 20B integrated with each other for analysis. Referring to FIGS. 1 through 23, the graph 2293 of FIG. 22 shows a plot of the amplitude 2281 of the band centered around the third harmonic frequency (in this case, 657.3 kHz) at each of the data points measured along the structure 570 with a 0.1 mm step size. The plot of the graph 2293 shows amplitude 2281 along the vertical axis and position 2283 (in mm) along the structure on the horizontal axis. The width (from about 5 mm to about 14 mm) of the peak 2266 indicates the presence of the crack, and the location of the peak 2266 (about 10.0 mm) indicates the location of the crack on the structure.

The graph 2393 of FIG. 23 shows a plot of the amplitude 2381 of the band centered around the third harmonic frequency (in this case, 657.3 kHz) at each of the data points measured along the structure 570 with a 0.05 mm step size. The plot of the graph 2393 shows amplitude 2381 along the vertical axis and position 2383 (in mm) along the structure on the horizontal axis. The width (from about 5 mm to about 14 mm) of the peak 2366 indicates the presence of the crack, and the location of the peak 2366 (about 10.0 mm) indicates the location of the crack on the structure.

In one or more example embodiments, small and recently-developed cracks in a structure disposed underwater can be detected. Example embodiments can also be used provide definition about the cracks and their location on the structure. Example embodiments include a transmitter, a receiver, and a controller. The transmitter emits acoustic signals at a given frequency (e.g., 100 kHz) toward a portion of a structure. The receiver receives and measures acoustic fields, which can include multiple harmonic frequencies, that result from the acoustic signals (waves) traveling through the structure. The controller analyzes the measurements made by the receiver to determine if a crack exists in the structure. If so, the controller can direct the transmitter and receiver to continue operating at different signal characteristics (e.g., frequencies) and/or locations relative to the structure to determine details about the crack.

The transmitter and receiver can be disposed on a vehicle (e.g., an underwater remotely-operated vehicle) to properly position both components during testing (e.g., while the transmitter emits acoustic signals and/or while the receiver receives acoustic fields). In certain example embodiments, the transmitter, the receiver, and the associated vehicle are located proximate to, but do not physically contact, the structure during testing. Structures that can be tested using example embodiments are equipment (e.g., platform structures, piping) in the oil and gas industry that are located underwater. Example embodiments can be used on a newly-commissioned structure or on a structure that has been service for any amount of time. Using example embodiments described herein can be used to detect and identify small cracks in a structure so that remedial action can be taken before the cracks (e.g., large, small, micro) develop and result in significant damage to the structure.

Accordingly, many modifications and other embodiments set forth herein will come to mind to one skilled in the art to which example embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for detecting cracks in an underwater structure, the system comprising:
 a first acoustic signal transmitter configured to be disposed proximate to, but without physically contacting, a first portion of the underwater structure, wherein the first acoustic signal transmitter is configured to emit a first plurality of acoustic signals at a first frequency toward the first portion of the underwater structure and to emit a subsequent plurality of acoustic signals at the first frequency toward the first portion of the underwater structure;
 a first acoustic field receiver configured to be disposed proximate to, but without physically contacting, the first portion of the underwater structure, wherein the first acoustic field receiver is configured to measure a first plurality of resulting acoustic fields, wherein the first plurality of resulting acoustic fields emanate from the first plurality of acoustic signals traveling through the first portion of the underwater structure, and to measure a subsequent plurality of resulting acoustic fields, wherein the subsequent plurality of resulting acoustic fields emanate from the subsequent plurality of acoustic signals traveling through the first portion of the underwater structure; and
 a controller communicably coupled to the first acoustic field receiver, wherein the controller is configured to:
  receive the first plurality of resulting acoustic fields and the subsequent plurality of resulting acoustic fields from the first acoustic field receiver;
  analyze the first plurality of resulting acoustic fields and the subsequent plurality of resulting acoustic fields; and
  detect, based on analyzing a third harmonic the first plurality of resulting acoustic fields and a third harmonic of the subsequent plurality of resulting acoustic fields, a first crack in the first portion of the underwater structure.

2. The system of claim 1, further comprising:
 an underwater vehicle that is configured to navigate underwater, wherein the first acoustic signal transmitter and the first acoustic field receiver are mounted on the underwater vehicle.

3. The system of claim 2, further comprising:
 a network manager communicably coupled to the controller and the underwater vessel, wherein the network manager controls the underwater vehicle to position the first acoustic signal transmitter and the first acoustic field receiver proximate to, but without physically contacting, the first portion of the underwater structure, and wherein the network manager receives detection of the first crack in the first portion of the underwater structure from the controller.

4. The system of claim 2, wherein the controller is further communicably coupled to the first acoustic signal transmitter, wherein the controller sets the first frequency of the first plurality of acoustic signals and the subsequent plurality of acoustic signals.

5. The system of claim 2, wherein the controller is further communicably coupled to the first acoustic signal transmitter, wherein the controller sets an amplitude of the first plurality of acoustic signals and the subsequent plurality of acoustic signals.

6. The system of claim 1, wherein the first plurality of acoustic signals are emitted at a first distance from the first portion of the underwater structure and wherein the subsequent plurality of acoustic signals are emitted at a second distance from the first portion of the underwater structure.

7. The system of claim 1, wherein the first acoustic signal transmitter and the first acoustic field receiver are configured to be moved after the first acoustic signal transmitter emits the subsequent plurality of acoustic signals to a different location proximate to, but without physically touching, a second portion of the underwater structure, wherein the first acoustic signal transmitter is configured to emit a second plurality of acoustic signals, wherein the first acoustic field receiver is configured to receive a second plurality of resulting acoustic fields, wherein the second plurality of resulting acoustic fields emanate from the second plurality of acoustic signals traveling through the second portion of the underwater structure, and wherein the controller is further configured to:
  receive the second plurality of resulting acoustic fields from the first acoustic field receiver;
  analyze the second plurality of resulting acoustic fields; and
  detect, based on analyzing a third harmonic of the second plurality of resulting acoustic fields, a second crack in the second portion of the underwater structure.

8. The system of claim 1, further comprising:
  a second acoustic signal transmitter configured to be disposed proximate to, but without physically contacting, a second portion of the underwater structure, wherein the second acoustic signal transmitter is configured to emit a second plurality of acoustic signals at a second frequency toward the second portion of the underwater structure; and
  a second acoustic field receiver configured to be disposed proximate to, but without physically contacting, the second portion of the underwater structure, wherein the second acoustic field receiver is configured to receive a second plurality of resulting acoustic fields, wherein the second plurality of resulting acoustic fields emanate from the second plurality of acoustic signals traveling through the second portion of the underwater structure, wherein the controller is further communicably coupled to the second acoustic field receiver, wherein the controller is further configured to:
    receive the second plurality of resulting acoustic fields from the second acoustic field receiver;
    analyze the second plurality of resulting acoustic fields; and
    detect, based on analyzing a third harmonic of the second plurality of resulting acoustic fields, a second crack in the second portion of the underwater structure.

9. The system of claim 1, wherein analyzing the first plurality of resulting acoustic fields comprises at least one harmonic of the first frequency.

10. The system of claim 1, wherein the first acoustic signal transmitter and the first acoustic field receiver are located within two signal lengths of the first plurality of acoustic signals from the first portion of the underwater structure.

11. The system of claim 1, wherein the first frequency is at least 50 kHz and no greater than 200 kHz.

12. A method for detecting cracks in an underwater structure, the method comprising:
  receiving, from an acoustic field receiver, a first plurality of resulting acoustic fields, wherein the first plurality of resulting acoustic fields emanate from a first plurality of acoustic signals traveling through a first portion of the underwater structure, wherein the acoustic field receiver is disposed proximate to, but without physically contacting, the first portion of the underwater structure;
  receiving, from the acoustic field receiver, a second plurality of resulting acoustic fields, wherein the second plurality of resulting acoustic fields emanate from a second plurality of acoustic signals traveling through the first portion of the underwater structure;
  analyzing the first plurality of resulting acoustic fields and the second plurality of resulting acoustic fields; and
  detecting, based on analyzing a third harmonic of the first plurality of resulting acoustic fields and analyzing a third harmonic of the second plurality of resulting acoustic fields, a crack in the first portion of the underwater structure.

13. The method of claim 12, further comprising:
  instructing an acoustic signal transmitter to emit the first plurality of acoustic signals toward the first portion of the underwater structure, wherein the acoustic signal transmitter is disposed proximate to, but without physically contacting, the first portion of the underwater structure.

14. The system of claim 12, further comprising:
  setting, on the acoustic signal transmitter, at least one of a group consisting of a frequency and an amplitude at which the first plurality of acoustic signals is emitted.

15. The method of claim 12, further comprising:
  controlling an underwater vehicle to position the underwater vehicle proximate to, but without physically contacting, the first portion of the underwater structure, wherein the acoustic signal transmitter and the acoustic field receiver are disposed on the underwater vehicle.

16. The method of claim 12, wherein the first plurality of acoustic signals are emitted at a first distance from the first portion of the underwater structure and wherein the second plurality of acoustic signals are emitted at a second distance from the first portion of the underwater structure.

17. The method of claim 12, further comprising:
  sending a notification about the crack in the first portion of the underwater structure.

18. A method for detecting cracks in a structure, the method comprising:
  receiving, from an acoustic field receiver, a first plurality of resulting acoustic fields, wherein the first plurality of resulting acoustic fields emanate from a first plurality of acoustic signals traveling through a first portion of the structure, wherein the acoustic field receiver is disposed proximate to, but without physically contacting, the first portion of the structure;
  receiving, from the acoustic field receiver, a second plurality of resulting acoustic fields, wherein the second plurality of resulting acoustic fields emanate from a second plurality of acoustic signals traveling through the first portion of the underwater structure;
  analyzing the first plurality of resulting acoustic fields and the second plurality of resulting acoustic fields; and
  detecting, based on analyzing a third harmonic of the first plurality of resulting acoustic fields and a third harmonic of the second plurality of resulting acoustic fields, a crack in the first portion of the structure.

19. The method of claim 18, wherein the first plurality of acoustic signals is generated by an acoustic signal transmitter in physical contact with the structure.

20. The method of claim 18, wherein the acoustic field receiver and the first portion of the structure are located out of water.

* * * * *